United States Patent
Nagata et al.

[11] Patent Number: 6,069,743
[45] Date of Patent: May 30, 2000

[54] ZOOM LENS SYSTEM

[75] Inventors: Tetsuo Nagata, Urawa; Yasuji Ogata, Akiruno, both of Japan

[73] Assignee: Olympus Optical Co., Ltd., Tokyo, Japan

[21] Appl. No.: 09/159,223

[22] Filed: Sep. 23, 1998

[30] Foreign Application Priority Data

Mar. 24, 1998 [JP] Japan .................................. 10-075374

[51] Int. Cl.$^7$ .............................. G02B 15/14; G02B 5/18
[52] U.S. Cl. .......................... 359/687; 359/566; 359/570; 359/676
[58] Field of Search .......................... 359/676, 683–685, 359/687, 688, 690, 692, 737, 739, 742, 566, 569–570, 574–576

[56] References Cited

U.S. PATENT DOCUMENTS

| | | | |
|---|---|---|---|
| 5,717,525 | 2/1998 | Estelle et al. | 359/677 |
| 5,790,321 | 8/1998 | Goto | 359/742 |
| 5,872,658 | 2/1999 | Ori | 359/677 |

FOREIGN PATENT DOCUMENTS

| | | |
|---|---|---|
| 9-197274 | 7/1997 | Japan . |
| 9-211329 | 8/1997 | Japan . |

*Primary Examiner*—Georgia Epps
*Assistant Examiner*—David N. Spector
*Attorney, Agent, or Firm*—Pillsbury, Madison & Sutro LLP

[57] ABSTRACT

The invention relates to a high-performance zoom lens system which can use a diffractive surface therein for use with an image sensor having a number of pixels. The zoom lens system includes at least a first lens group G1 having positive power and a second lens group G2 having negative power between an object side of the system and an aperture stop S. The first lens group G1 includes at least one diffractive surface $r_1$, and satisfies the following condition:

$$0.001 < f_S/f_{DOE} < 0.025 \qquad (1)$$

Here $f_S = \sqrt{f(f_W \times f_T)}$ wherein $f_W$ and $f_T$ are focal lengths of the zoom lens system at its wide-angle end and its telephoto end, respectively, and $f_{DOE}$ is a focal length of the diffractive surface $r_1$.

14 Claims, 14 Drawing Sheets

ZOOM LENS SYSTEM

BACKGROUND OF THE INVENTION

The present invention relates generally to a zoom lens system used with an imaging device, and more particularly to a zoom lens system suitable for use with video cameras, digital still cameras, etc. The present invention also relates to the allowable value required to obtain good images by use of an image pickup element.

So far, many zoom lenses for video cameras have been proposed in the art, as typically disclosed in JP-A's 5-60972, 5-107473 and 6-94997. All examples given therein are directed to a four lens group type zoom lens system comprising, in order from an object side thereof, a first lens group having positive power, a second lens group having negative power, a third lens group having positive power and a fourth lens group having positive power, with each lens group comprising one to three lenses. Referring to the basic role of each lens group in zooming, the second lens group moves flatly to play a chief zooming role, and the fourth lens group acts as a compensator. As in JP-A 6-94997, the third and fourth lens groups are often designed to move together.

In recent years, digital still cameras have attracted public attention as peripheral equipment (image input equipment) for personal computers. Digital still cameras or video cameras are equipment for forming an image on an image sensor such as a CCD and acquiring information in the form of electric signals. Currently available phototaking lenses are all of the telecentric type because for structural reasons of the image sensor, light beams are shaded by the image sensor upon oblique incidence thereon (the so-called shading phenomenon).

Consequently, the same basic type of phototaking lens is used for both cameras. However, there is a large difference between the image qualities required by users. For instance, when video cameras or digital cameras are used for entering images into personal computers, even an image sensor having about 400,000 pixels may be practically acceptable. In applications where printed images are enjoyed, or used in place of silver salt photographs, however, it is required to use an image sensor having more than 1,000,000 pixels or of a so-called mega-pixel class. As a result, the pixel pitch of the sensor becomes small, and the performance, e.g., resolution needed for a phototaking lens used therewith must be increased to an ever higher level, accordingly.

For such a zoom lens system, it is preferable that aberrations produced in each lens group are reduced as much as possible. To this end, it is required that each lens group be made up of some positive and some negative lenses to reduce aberrations produced therein as much as possible. If the amount of chromatic aberrations produced in the first lens group are not reduced as much as possible, then the height of axial marginal light rays is increased to produce a large amount of longitudinal chromatic aberration on the telephoto side. Consequently, the performance of the zoom lens system becomes worse. To make satisfactory correction for chromatic aberrations on the telephoto side, it is thus required to use a doublet or other chromatic aberration corrector element in the first lens group. A typical example of using a chromatic aberration corrector element in the first lens group is a zoom lens system disclosed in JP-A 9-211329 that proposes to use a diffractive optical element (DOE) to make correction for chromatic aberrations.

JP-A 9-211329, mentioned above, proposes to use a diffractive surface in a first or second lens group in a positive/negative/positive/positive four lens group type zoom lens system, thereby achieving a zoom ratio of 5.7. However, this zoom lens system is very unsatisfactory in terms of correction of aberrations irrespective of using the diffractive surface, and so is practically unacceptable.

Applications of diffractive surfaces to various optical systems are shown in "Diffractive optics at Eastman Kodak Company", SPIE, Vol. 2689, pp. 228–254. This article refers primarily to applications of diffractive optical elements to color separation filters although a brief account is given of digital still cameras. However, the article says nothing about an application of the DOE to phototaking lenses themselves.

With a DOE having a low diffraction efficiency with respect to the design order of diffraction, the intensity of light other than design light (e.g., zero-order light and second-order light when the DOE is designed with first-order light, and hereinafter defined as unnecessary light) becomes too high to obtain good-enough image qualities. Especially in order for the DOE to be used in a wide wavelength range ($\lambda$=about 400 nm to 700 nm) wherein phototaking lenses, etc. are used, the diffraction efficiency should be sufficiently high. To improve the diffraction efficiency of the DOE, it is preferable to impart a saw-toothed configuration to the sectional shape of the DOE. In this way, it is theoretically possible to achieve a diffraction efficiency of 100% with respect to one wavelength or one field angle. However, the larger the angle of incidence of a light beam on the diffractive surface, the lower the diffraction efficiency is. For details, see articles "Scalar theory of transmission relief gratings", Optics Communications, Vol. 80, No. 5, 6/307–311 (1991), and "Blazed holographic gratings for polychromatic and miltidirectional incident light", J. Opt. Soc. Am., Vol. 9, No. 7/1196–1199 (1992). Consequently, the zoom lens system according to JP-A 9-211329 cannot be immediately used because the angle of incidence of a light beam on the diffractive surface becomes very large. Also, when the DOE is used in a first lens group in a zoom lens system having a high zoom ratio of about 3 or more, it is required to reduce the angle of incidence of a light beam as much as possible because there is a large change in the angle of incidence of a light beam on the diffractive surface from the wide-angle end to the telephoto end.

SUMMARY OF THE INVENTION

With such problems with the prior art in mind, one object of the invention is to provide a high-performance zoom lens system which can be used with an image sensor having a large number of pixels by use of a diffractive surface.

Another object of the invention is to provide a zoom lens system which can be used with an image sensor having a large number of pixels by properly determining the amount of remnant aberrations.

Yet another object of the invention is to provide a high-performance zoom lens system which is well corrected for chromatic aberrations by using a diffractive optical element in a first lens group while a diffraction efficiency drop is reduced by reducing the angle of incidence of a light beam on a diffractive surface as much as possible, and comprises a reduced number of lenses, and an imaging device using the same.

According to one aspect of the invention, there is provided a zoom lens system comprising at least a first lens group having positive power and a second lens group having negative power and an aperture stop on the image side of the second lens group, characterized in that said first lens group comprises at least one diffractive surface, and satisfies the following condition:

$$0.001 < f_S/f_{DOE} < 0.025 \quad (1)$$

where $f_S = \sqrt{(f_W \times f_T)}$ wherein $f_W$ and $f_T$ are focal lengths of the zoom lens system at a wide-angle end thereof and a telephoto end thereof, respectively, and $f_{DOE}$ is a focal length of the diffractive surface.

According to another aspect of the invention, there is provided a zoom lens system comprising at least a first lens group having positive power and a second lens group having negative power and an aperture stop on the image side of the second lens group, characterized by satisfying the following condition:

$$|\Delta p/t| < 4, \ |\Delta s/t| < 4 \quad (2)$$

where $\Delta p$ is an amount of transverse aberration of spherical aberrations at an axial maximum ray height and is calculated with respect to C-line and g-line at a wide-angle end of the zoom lens system and a telephoto end of the zoom lens system, $\Delta s$ is an amount of chromatic aberration of magnification at an image height that is 7/10 of a maximum image height and is calculated with respect to C-line and g-line at the wide-angle end and the telephoto end, and t is a pitch of one pixel in an image sensor used with the zoom lens system.

According to yet another aspect of the invention, there is provided a zoom lens system comprising at least a first lens group having positive power and a second lens group having negative and an aperture stop on the image side of the second lens group with a space between said first lens group and said second lens group being variable for zooming, characterized in that said first lens group includes a diffractive surface, and an angle of incidence of all chief rays on said diffractive surface during zooming satisfies the following condition:

$$-0.60 < N_{DOE} \sin \theta < 0.70 \quad (9)$$

where $N_{DOE}$ is a refractive index of a medium on a side of said diffractive surface located on an object side thereof with respect to an optimum design wavelength for a diffractive optical element, and $\theta$ is the angle of incidence of chief rays on said diffractive surface, said angle of incidence being defined by a normal direction of a substrate material forming said diffractive surface and a chief ray at an infinite object point distance.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
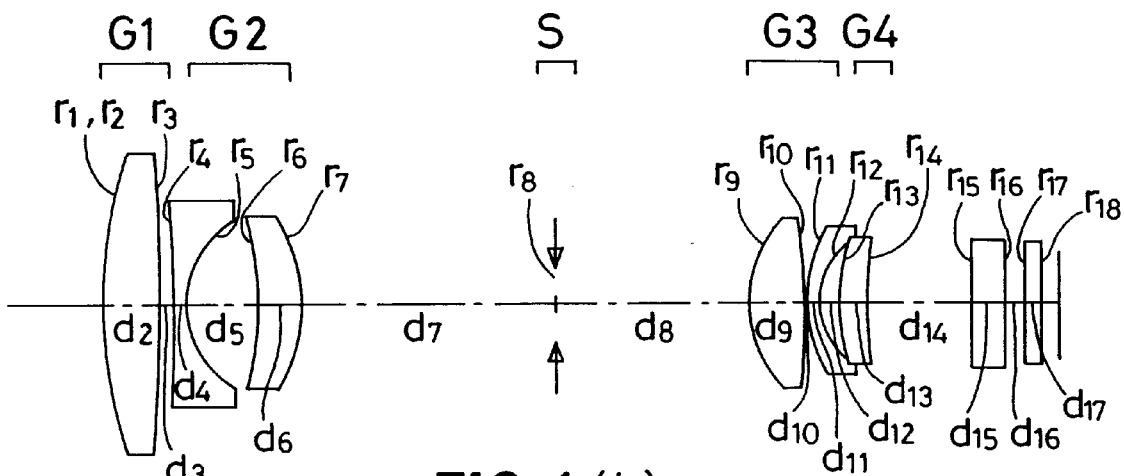
FIGS. 1(*a*), 1(*b*) and 1(*c*) are sectional schematics, including an optical axis, of Example 1 of the inventive zoom lens system at a wide-angle end (*a*) thereof, a standard setting (*b*) thereof and a telephoto end (*c*) thereof, respectively.

Prior to explaining examples of the zoom lens system according to the present invention, an account is first given of why the aforesaid arrangements are used in the invention, and how they work.

In general, the resolution of a digital depends largely on the number of pixels in an image sensor, and it is now believed that high image quality means a large number of pixels. On the other hand, image sensor size is determined by the number of pixels and the size (pitch) of one pixel. If a number of pixels, each having a large pitch, are used to construct an image sensor, the image sensor itself then increases in size, resulting in an increase in the overall size of an optical system. For a sensible tradeoff between size reductions and high performance, therefore, pixel pitch reductions are desired and now achieved to some extent.

However, pixel pitch reductions cause the Nyquist frequency of the system to become high. Consequently, the level of correction of aberrations required for an optical system becomes too high to design lenses. Correction of chromatic aberrations in particular is achievable only by a choice of material, but optical materials usable to this end are still limited. From a cost perspective, it is extremely difficult to make correction for chromatic aberrations because of the need to use costly materials or to increase the number of lenses.

According to the present invention, the diffractive surface is properly located to make satisfactory correction for chromatic aberrations, which becomes a matter of great concern when the number of pixels is increased. More specifically, a diffractive surface that can satisfy condition (1) is used in the first lens group having positive power. In the first lens group, there is a large difference between the heights of chief rays corresponding to respective image heights, so that longitudinal chromatic aberration and chromatic aberration of magnification can be corrected in a well-balanced state. In the practice of the invention, it is particularly important for the diffractive surface to satisfy condition (1). When the lower limit of 0.001 is not reached, the power and effect of the diffractive surface becomes weak and so it is impossible to make sufficient correction for chromatic aberrations. When the upper limit of 0.025 is exceeded, on the other hand, both the power and effect of the diffractive surface become too strong, resulting in the generation of excessive secondary spectra at the diffractive surface. This causes chromatic aberrations to become worse.

To achieve increased performance, it is particularly desired for the diffractive surface to satisfy the range defined by the following condition (3):

$$0.003 < f_S/f_{DOE} < 0.018 \quad (3)$$

Referring here to the principle of a digital still camera, a picture image is formed by discretely sampling an image formed on an image sensor through a phototaking lens. If there are considerable chromatic aberrations, images of different colors are then taken in pixels in an imaging device, resulting in a blurring of colors and, hence, a noticeable deterioration in image quality. In order to obtain high-quality images, it is thus required to place the amount of chromatic aberrations produced under severe control. To be specific, it is desired for the zoom lens system to satisfy condition (2). If the upper limit of 4 in condition (2) is exceeded, chromatic aberrations become large, resulting in a blurring of colors which is not acceptable to an image sensor of the mega-pixel class. Such behavior becomes particularly noticeable at a marginal image area. It is thus desired to preset the amount of chromatic aberration of magnification produced according to the following condition (4):

$$|\Delta p/t| < 4, \; |\Delta s/t| < 2 \quad (2)$$

By designing the amount of chromatic aberration of magnification according to this condition, it is possible to achieve a good-quality image with a greatly reduced blurring of colors from its center to its periphery.

Chromatic aberrations can be corrected well by making proper use of a diffractive surface. Correction of monochromatic aberrations is also essential for obtaining high image quality. At this time, high image quality should be balanced against a size reduction of an optical system. For a sensible compromise between size reduction and high image quality, it is desired to satisfy the following condition (5):

$$0.1 < f_S/f_1 < 0.6 \quad (5)$$

where $f_1$ is a focal length of the first lens group.

When the lower limit of 0.1 in condition (5) is not reached, the power of the first lens group becomes weak, resulting in an increase in the amount of movement of the zooming lens groups during zooming and, hence, a size increase of the optical system. When the upper limit of 0.6 is exceeded, on the other hand, the power of the first lens group becomes strong. This may be acceptable to the size reduction, but high image quality is not achievable because of an increase in the amount of monochromatic aberrations produced.

More preferably, the range defined by the following condition (6) should be satisfied.

$$0.1 < f_S/f_1 < 0.5 \quad (6)$$

Both conditions (1) and (5) have no relation to the zoom ratio of the optical system. With the zoom ratio in mind, however, it is preferable to satisfy the following conditions (7) and (8):

$$0.0001 < f_S/(Z \times f_{DOE}) < 0.005 \quad (7)$$

$$0.01 < f_S/(Z \times f_1) < 0.1 \quad (8)$$

where $Z = f_T/f_W$. By satisfying these conditions, it is possible to obtain an optical system of high image quality irrespective of the zoom ratio.

Then, the zoom lens system according to the third aspect of the invention is explained.

This zoom lens system of the invention comprises at least a first lens group having positive power and a second lens group having negative power and an aperture stop on the image side of the second lens group with a space between the first lens group and the second lens group being variable for zooming, and is characterized in that the first lens group comprises a diffractive surface, and the angle of incidence of all chief rays on the diffractive surface during zooming satisfies the following condition:

$$-0.60 < N_{DOE} \sin \theta < 0.70 \quad (9)$$

where $N_{DOE}$ is a refractive index of a medium on a side of the diffractive surface located on the object side with respect to the optimum design wavelength $\lambda_{DOE}$ for a diffractive optical element (DOE). $\lambda_{DOE}$ is a wavelength at which the highest diffraction efficiency is obtained, as defined by the following function:

$$d = m\lambda_{DOE}/\{n(\lambda_{DOE}) - 1\}$$

where d is a groove depth in the DOE, $n(\lambda DOE)$ is a refractive index of a substrate material thereof, and m is an order of diffraction.

Figure 12:
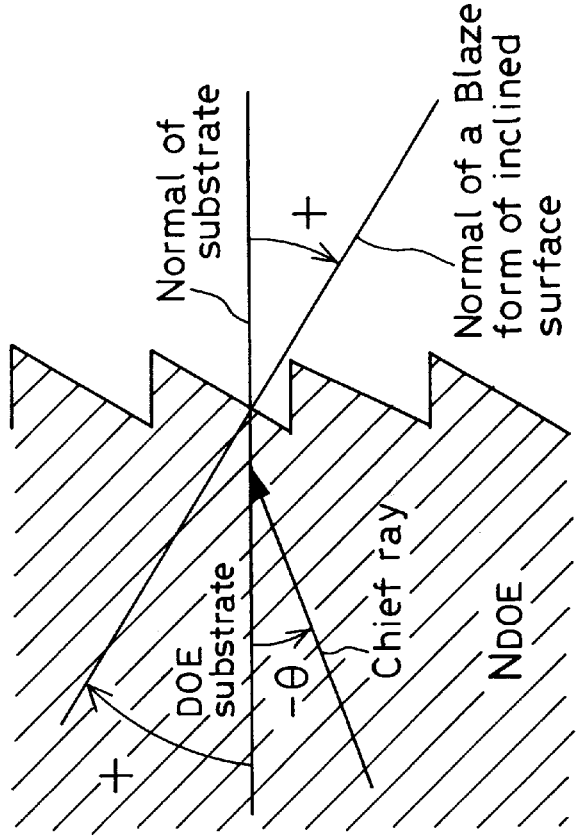
FIG. 12 is a schematic view illustrative of a sign annexed to $\theta$.
Figure 12:
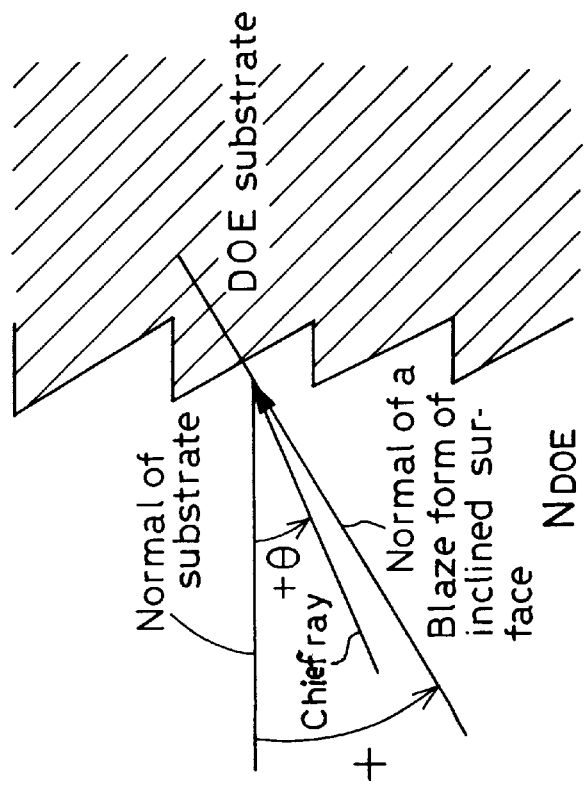

In condition (9), $\theta$ is the angle of incidence of all chief rays on the diffractive surface, said angle of incidence being defined by a normal direction of a substrate material forming the diffractive surface and a chief ray at a infinite object point distance. For instance, a plus sign annexed to $\theta$ means a direction from the normal direction of the substrate material forming the diffractive surface toward a normal direction of a blaze form of inclined surface in the diffractive surface, as shown in FIG. 12. In this regard, FIG. 12(a) illustrates the incidence of incident light from an air side onto a substrate material side, and FIG. 12(b) illustrates the incidence of incident light from the substrate material side into the air side.

Figure 13:
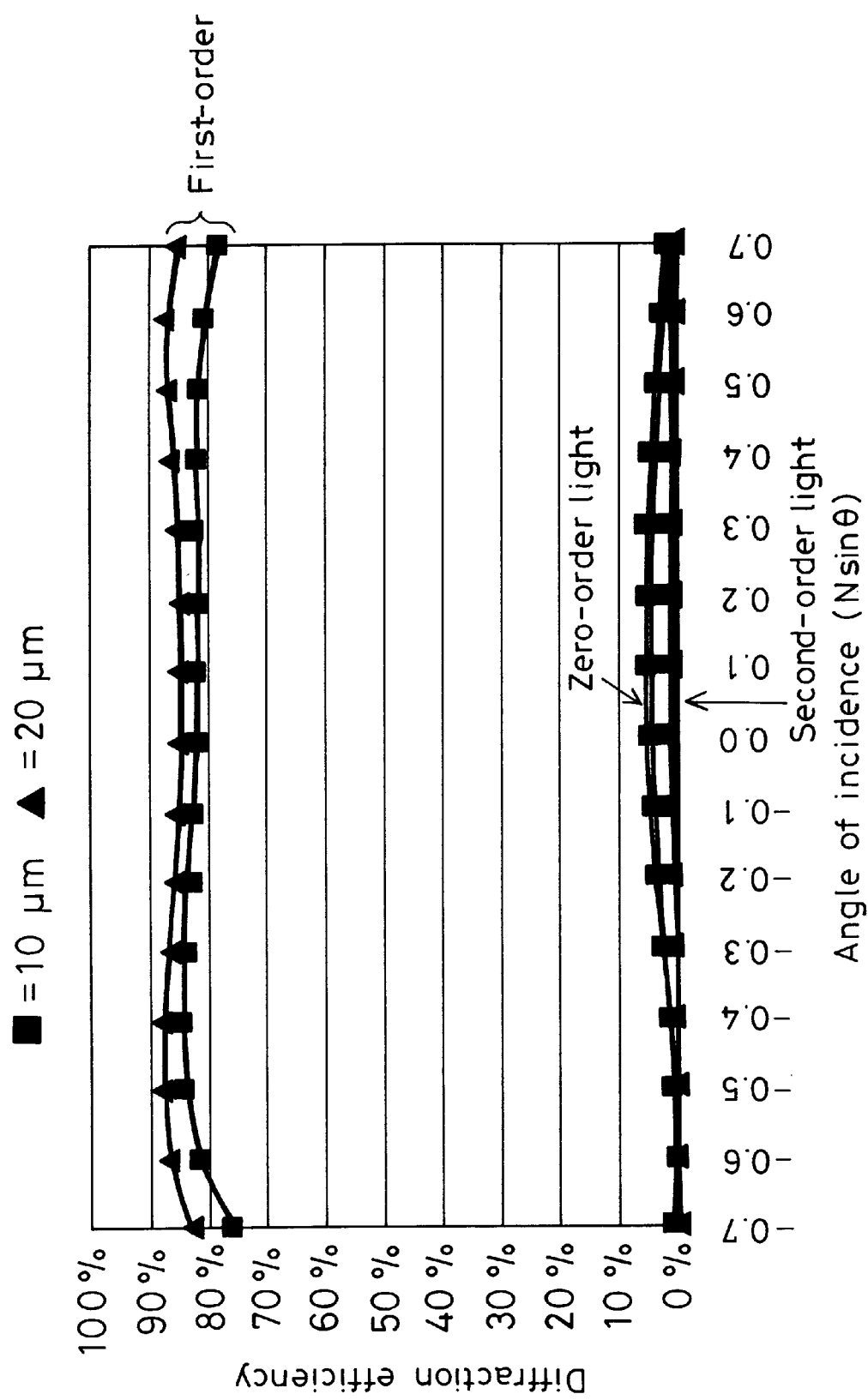
FIG. 13 is a diagram illustrative of the dependence on the angle of incidence of diffraction efficiency for each order of light at C-line.
Figure 14:
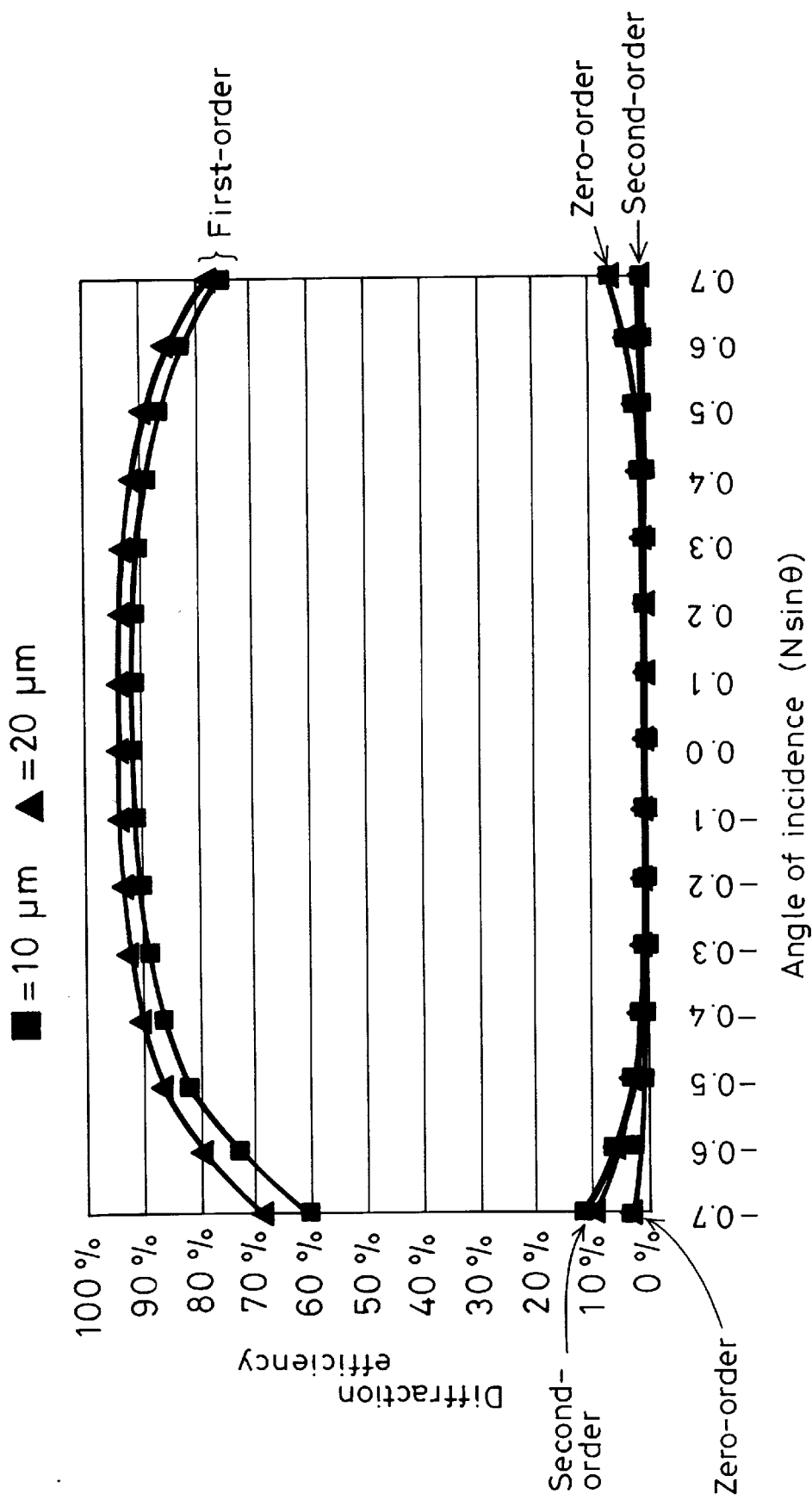
FIG. 14 is a diagram illustrative of the dependence on the angle of incidence of diffraction efficiency for each order of light at e-line.
Figure 15:
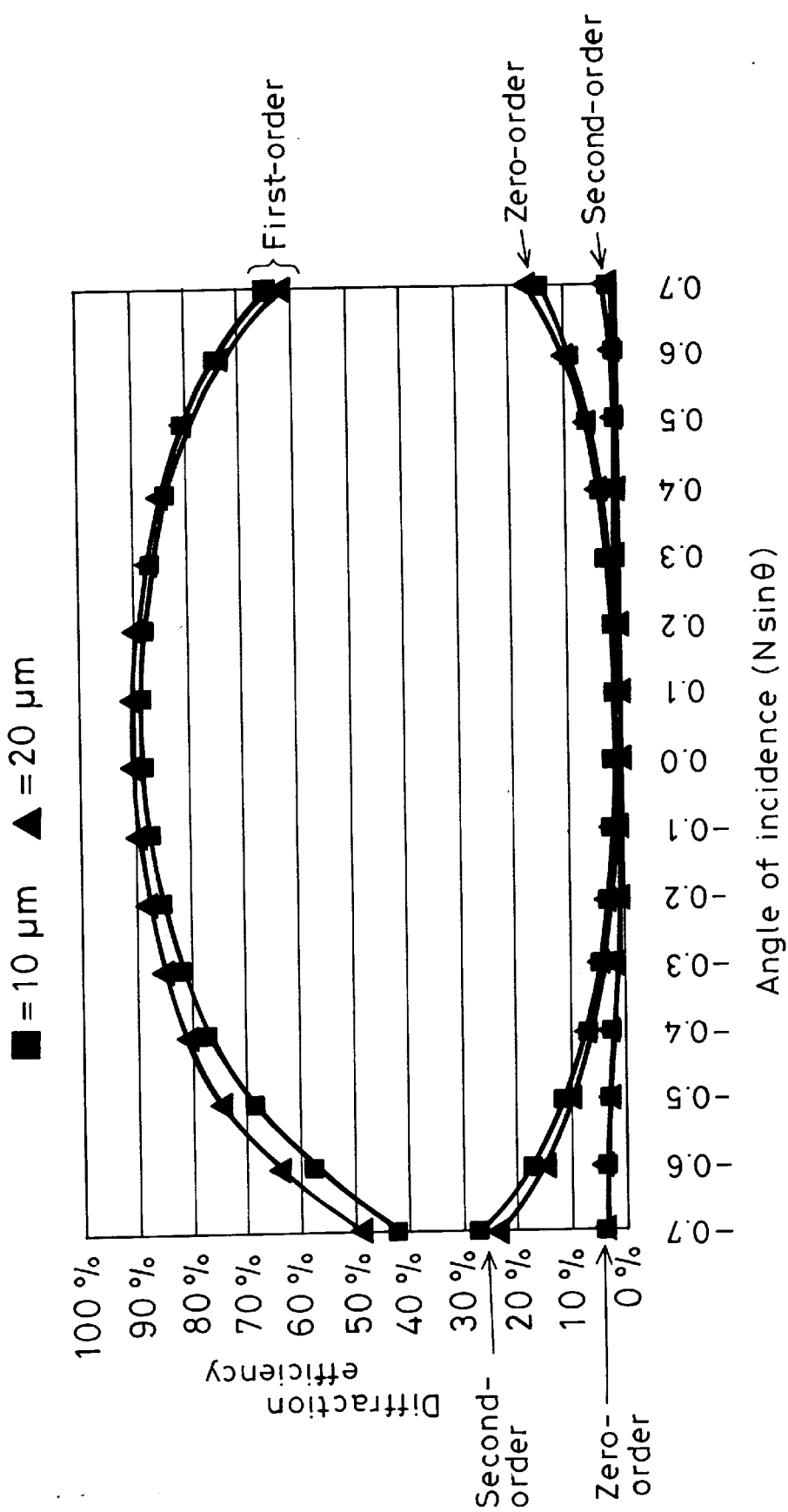
FIG. 15 is a diagram illustrative of the dependence on the angle of incidence of diffraction efficiency for each order of light at F-line.

When a DOE is applied to a phototaking lens, it is required to increase its diffraction efficiency, as already noted. Since the DOE depends on the angle of incidence of light thereon, however, the diffraction efficiency drops greatly when the angle of incidence of a light beam on the diffractive surface is large. FIGS. 13, 14 and 15 are graphs showing the dependence on the angle of incidence of light of first-order diffraction efficiency for each wavelength, on condition that the optimum design wavelength for a DOE is e-line, the e-line index of refraction of the substrate material is $N_e=1.5$, the period of gratings is $\Lambda=10$ μm and $\Lambda=20$ μm, and the side on which light rays are incident is defined by air. Set out in these graphs are the diffraction efficiencies of TE polarization of zero-order light, first-order light, and second-order light at C-line, e-line, and F-line, respectively. Note also that reflections at lens interfaces, are incorporated into the results of calculation. From the graphs, it is found that, with an increase in the angle of incidence of light, the diffraction efficiency of the first-order light drops while the diffraction efficiency of unnecessary light increases. In addition, there is a noticeable diffraction efficiency drop on a shorter wavelength side (F-line), which is a chief cause of a deterioration in image quality when a DOE is used in a visible range (wavelengths of about 400 nm to about 700 nm) where a phototaking lens is used. For this reason, it is required to decrease the diffraction efficiency of unnecessary light to some degrees.

Condition (9) is provided to limit the diffraction efficiency of unnecessary light. A departure from the lower limit of −0.60 and the upper limit of 0.70 in condition (9) is not preferable because the diffraction efficiency of unnecessary light on a shorter wavelength side exceeds 20% at the maximum angle, and so the contrast of a blue image in RGB color images drops significantly, resulting in a marked deterioration in image quality.

More preferably, the range defined by the following condition (13) must be satisfied:

$$-0.50 < N_{DOE} \sin \theta < 0.60 \tag{13}$$

This range is more preferable because it is possible to limit the diffraction efficiency of unnecessary light on a shorter wavelength side to about 10%, and because it is possible to limit the diffraction efficiency of unnecessary light at the optimum design wavelength to about 2% to about 3%.

Most preferably, the range defined by the following condition (14) should be satisfied:

$$-0.35 < N_{DOE} \sin \theta < 0.35 \tag{14}$$

If this range is satisfied, it is then possible to make the diffraction efficiency of unnecessary light much lower than mentioned above.

According to a fourth aspect of the invention, there is provided a zoom lens system comprising at least a first lens group having positive power and a second lens group having negative power and an aperture stop on the image side of the second lens group with a space between the first lens group and the second lens group being variable for zooming, characterized in that the first lens group comprises a diffractive surface, and the following condition is satisfied:

$$0.2 < R_{DOE}/f_S < 15.0 \tag{10}$$

where $R_{DOE}$ is a paraxial radius of curvature of a substrate material of which a diffractive optical element having a diffractive surface is formed, and $f_S = \sqrt{(f_W \times f_T)}$ wherein $f_W$ and $f_T$ are focal lengths of the zoom lens system at a wide-angle end thereof and a telephoto end thereof, respectively.

The location of the diffractive surface within the zoom lens system should be taken into consideration because the angles of incidence of light beams on lens surfaces in the first lens group vary largely from its wide-angle end to its telephoto end. Especially because the angle of incidence of light on the wide-angle side of the system becomes very large, a surface in the first lens group of the zoom lens system, at which the diffractive surface is to be used, should preferably have a given curvature within the range defined by condition (10).

Condition (10) is provided to give a definition of the paraxial radius of curvature of a substrate material having a diffractive surface. Within this range, it is possible to prevent a large diffraction efficiency drop due to the dependence of diffraction efficiency on the angle of incidence of light. When the upper limit of 15.0 in condition (10) is exceeded, the diffraction efficiency of unnecessary light increases due to an increase in the angle of incidence of off-axis light beams on the wide-angle side of the system. This is undesirable because a low contrast causes a deterioration in image quality on the wide-angle side of the system. If the lower limit of 0.2 is not reached, the angle of incidence of off-axis light beams on the telephoto side of the system increases to cause a deterioration in image quality on the telephoto side of the system. This, too, is undesirable.

More preferably, condition (10) is reduced to the following condition (15):

$$1.0 < R_{DOE}/f_S < 10 \tag{15}$$

Within this narrow range, it is possible to keep the diffraction efficiency of unnecessary light low from the wide-angle end to the telephoto side of the system and thereby prevent a lowering of the contrast of image quality.

Most preferably, condition (10) is reduced to the following condition (16):

$$1.3 < R_{DOE}/f_S < 10.0 \tag{16}$$

Within this narrowest range, it is possible to keep the diffraction efficiency of unnecessary light low from the wide-angle end to the telephoto side of the system and thereby prevent a lowering of the contrast of image quality.

According to a fifth aspect of the invention, there is provided a zoom lens system comprising at least a first lens group having positive power and a second lens group having negative power and an aperture stop on the image side of the second lens group with a space between the first lens group and the second lens group being variable for zooming, characterized in that the first lens group comprises at a surface located on an object side thereof a diffractive optical element having a diffractive surface.

As can be seen from FIGS. 13 to 15, the dependence of diffraction efficiency on the angle of incidence of light also varies depending on the index of refraction of a side of the diffractive surface located on the object side of the first lens group. As already mentioned, the angle of incidence of light beams on the first lens group of the zoom lens system varies largely from the wide-angle side to the telephoto side thereof. In other words, the zoom lens system should be designed in such a way that the contribution of the dependence of diffraction efficiency on the angle of incidence of light is reduced. When the DOE is used in the first lens group, it is thus desired to use the diffractive surface on the side of the lens located on the object side thereof. For instance, consider the case where the index of refraction of a DOE substrate material is 1.5 at its optimum design wavelength. If, in this case, a light beam is incident on the diffractive surface at the same angle of 30°, $N_{DOE} \sin \theta = 0.5$ when the diffractive surface is used on the object side of the first lens group whereas $N_{DOE} \sin \theta = 0.75$ when the diffractive surface is used on an image side of the first lens group. By use of the diffractive surface in the first lens group, it is thus possible to make very satisfactory correction for longitudinal chromatic aberration on the telephoto side of the zoom lens system. Further, by using the diffractive surface on the side of the DOE located on the object side of the first lens group, it is possible to prevent a striking diffraction efficiency drop due to the angle of incidence of light.

In the practice of the invention, each of the zoom lens systems according to the third to fifth aspect of the invention should preferably comprise at least one lens group between the aperture stop and an image side thereof. By constructing the zoom lens system of three or more lens groups, it is possible to achieve further size reductions and ever higher performance.

Preferably, the zoom lens system according to the fourth aspect of the invention should satisfy the conditions for the zoom lens system according to the fifth aspect of the invention at the same time. When a diffractive surface is attached to a substrate material that satisfies condition (10), it is preferable to attach the diffractive surface to a side of the DOE located on an object side thereof, thereby preventing a lowering of the diffraction efficiency of the DOE due to its dependence on the angle of incidence of light. In each of the zoom lens systems according the third to fifth aspects of the invention, the angle of incidence of light rays on the DOE used in the first lens group is kept small from the wide-angle end to the telephoto end thereof.

It is further preferable that each of the zoom lens systems according to the third to fifth aspects of the invention satisfies either one of the following conditions:

$$2.5 < Z < 20.0 \quad (17)$$

$$0.001 < f_S/f_{DOE} < 0.1 \quad (18)$$

where $Z = f_T/f_W$ or Z is a zoom ratio, and $f_{DOE}$ is a focal length of the diffractive surface alone.

Condition (17) indicates that the zoom lens system of the invention has high magnification. When the lower limit of 2.5 in condition (17) is not reached, no high zoom ratio is obtainable. In addition, there is no large fluctuation in the height of axial marginal light rays incident on the first lens group from the wide-angle end to the telephoto end of the system. For this reason, it is possible to make satisfactory correction for chromatic aberrations without recourse to a DOE; there is limited benefit to using the DOE. Exceeding the upper limit of 20.0 in condition (17) is undesirable because the angle of incidence of light beams on the DOE cannot be kept small from the wide-angle side to the telephoto side of the system.

Condition (18) is provided to give a definition of the power of the diffractive surface or, actually, limit the width of a DOE grating. When the lower limit of 0.001 in condition (18) is not reached, the power of the DOE becomes very weak, resulting in an extreme decrease in the number of DOE zones. This is undesirable because the image-forming capability becomes worse due to no diffraction of light beams. When the upper limit of 0.1 in condition (18) is exceeded, the grating width becomes very narrow. This is again undesirable because there is a significant diffraction efficiency drop due to the dependence of the DOE on the angle of incidence of light.

It is thus desired that the zoom lens system of the invention satisfy condition (17) or (18).

If condition (18) is reduced to the following condition (19), it is then possible to reduce the dependence of the DOE on the angle of incidence of light and thereby achieve improved performance.

$$0.001 < f_S/f_{DOE} < 0.024 \quad (19)$$

Preferably, each of the zoom lens systems according to the third to fifth aspects of the invention should satisfy the following conditions:

$$0.1 < f_S/f_1 < 0.5 \quad (11)$$

$$-2.5 < f_S/f_2 < -0.1 \quad (12)$$

where $f_1$ and $f_2$ are focal lengths of the first lens group and second lens group, respectively, so that it can be well corrected for monochromatic aberrations.

Conditions (11) and (12) are provided to standardize the first lens group and second lens group at a standard focal length (setting) of the overall system. When the lower limit of 0.1 in condition (11) is not reached, the positive power of the first lens group becomes weak. This is undesirable especially because it is difficult to make correction for negative distortion greatly produced at the wide-angle end of the system. When the upper limit of 0.5 in condition (11) is exceeded, the power of the first lens group becomes too strong. This is again undesirable because the power of the second lens group must be increased to advance of a sufficient back focus, resulting in an increase in the amount of monochromatic aberrations produced at each lens group.

When the lower limit of −2.5 in condition (12) is not reached, a sufficient back focus may be advantageously achieved with size reductions of the lens system. However, since the power of other positive lens group must be increased, monochromatic aberrations become much too worse to keep high performance. Exceeding the upper limit of −0.1 in condition (12) is undesirable because any back focus cannot be achieved with size reductions of a photo-taking lens.

By satisfying conditions (11) and (12) at the same time, it is thus possible to make satisfactory correction for monochromatic aberrations from the wide-angle end to the telephoto end of the system.

Preferably, conditions (11) and (12) are reduced to the following conditions (20) and (21), respectively:

$$0.2 < f_S/f_1 < 0.4 \quad (20)$$

$$-2.3 < f_S/f_2 < -0.5 \quad (21)$$

Within these ranges, it is possible to make more satisfactory correction for monochromatic aberrations.

The present invention provides an image device designed using any one of the aforesaid zoom lens systems. By use of these zoom lens systems, it is possible to provide a very compact yet high-performance imaging device.

Examples 1 to 11 of the zoom lens system according to the invention will now be explained.

The Sweatt model is well known for methods of designing a zoom lens system using a diffractive optical element (DOE) such as one used in the invention, as typically described in W. C. Sweatt, "NEW METHODS OF DESIGNING HOLOGRAPHIC ELEMENTS", SPIE, Vol. 126, Clever Optics 46–53 (1977). In this model, a DOE is used instead of a virtual refractive lens having a very high refractive index (an ultra-high index lens). In the following examples, too, this model is used. It is here to be noted that the DOE in each example is designed to have a virtual refractive index of 1001 at 587.56 nm wavelength (d-line). An aspherical surface of the ultra-high index lens is defined as follows, provided that an optical axis direction is defined as a Z-axis and a direction perpendicular thereto as a Y-axis. That is, the aspherical surface is given by $$Z=CY^2/[1+\sqrt{1-(1+K)C^2Y^2}]+A_4Y^4+A_6Y^6+A_8Y^8+A_{10}Y^{10+} \quad (a)$$

where C is curvature at a surface apex (=1/r where r is a radius of curvature), K is a conical coefficient, and $A_4$, $A_6$, $A_8$ and $A_{10}$ are fourth, sixth, eighth and tenth-order aspherical coefficients, respectively.

The surface coming in contact with the diffractive surface at null thickness is a surface of the substrate material. In actual fabrication, the diffractive surface is formed on the surface of the substrate material using a phase change found from a difference between the aspherical shape of the diffractive surface and the surface shape of the material and the indices of refraction. In other words, it is the surface of the substrate material which has a final lens action in each of the examples given later. In this regard, it is to be noted that an aspherical surface defined by an ultra-high index refractive lens and here called the diffractive surface does not actually exist. In the lens section corresponding to each example, however, surface Nos. denoting in the numerical data are shown in terms of $r_1$, etc.

Figure 16:
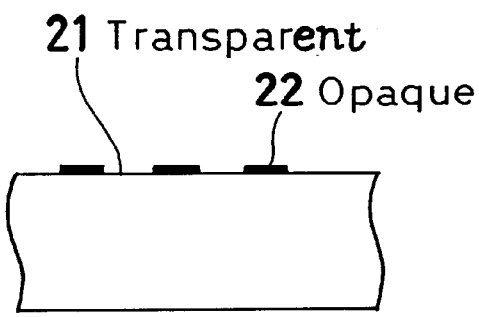
FIG. 16(*a*) to 16(*f*) are sectional schematics illustrative of specific shape of the diffractive surface.
Figure 16:
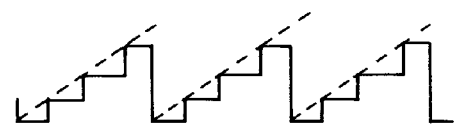
Figure 16:
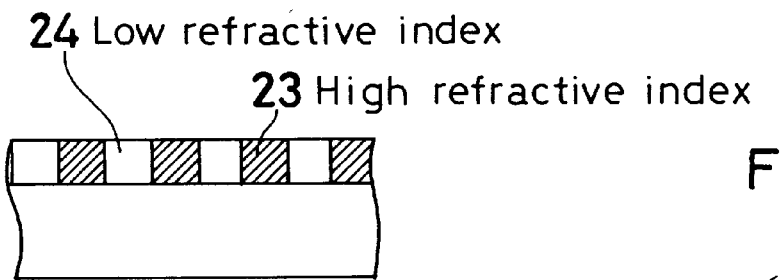
Figure 16:
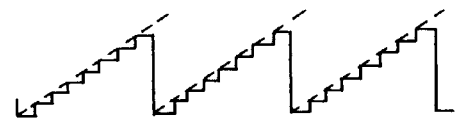
Figure 16:
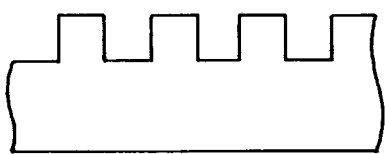
Figure 16:
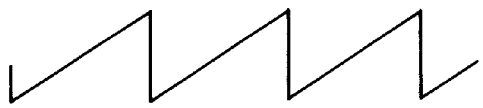

Some exemplary sectional shapes of the diffractive surface are shown in FIG. 16. Shown in FIG. 16(*a*) is a diffractive surface called an amplitude-modulated type wherein an alternate arrangement of transparent and opaque portions 21 and 22 is provided, with the thickness of each opaque portion 22 being substantially zero. Shown in FIG. 16(*b*) is an alternate arrangement of high- and low-refractive index portions 23 and 24, to which diffraction is imparted through a phase difference due to a refractive index difference. Shown in FIG. 16(*c*) is an alternate arrangement of rectangular asperities, to which diffraction is imparted through a phase difference due to a thickness difference. This arrangement is also called a 2-level binary element. Shown in FIG. 16(*d*) is a kinoform arrangement having a sawtoothed surface, to which diffraction is imparted by a phase difference due to a continuous thickness difference. FIGS. 16(*e*) and (*f*) are illustrative of binary elements to 4-, and 8-level approximation (see FIG. 3). Thus, some diffractive surface shapes are available. In the practice of the invention, however, it is preferable to use the kinoform of FIG. 16(*e*), and the 4-, or more level binary elements of FIGS. 16(*e*) and 16(*f*) so that the diffraction efficiency can be increased to make full use of the quantity of light.

Examples 1 to 11 are each directed to a zoom lens system comprising four lens groups, i.e., in order from an object side thereof, a first lens group G1 having positive power, a second lens group G2 having negative power, an aperture stop S, a positive lens group G3 having positive power, and a fourth lens group G4 having positive power, as shown in FIGS. 1, 3, 8 and 9 that are sectional views including an optical axis of Examples 1, 3, 8 and 9 at wide-angle ends (*a*) thereof, standard settings (*b*) thereof and telephoto ends (*c*) thereof, and in FIGS. 2, 4–7, 10 and 11 that are sectional views including an optical axis of Examples 2, 4–7, 10 and 11 at wide-angle ends thereof. In all examples except Example 8, the first lens groups include a diffractive surface. Throughout Examples 1 to 11, the first lens groups are fixed with respect to an image plane during zooming. The second lens groups are movable, and take a primary zooming role. The third and fourth lens groups, too, are movable, but they make correction for the image plane or for aberrations. Numerical data on each example will be given later. It is here to be noted that 1 to 3 plane-parallel plates located nearest to the image side in Examples 1 to 11 are assumed as an infrared cutoff filter, a low-pass filter, a protective plate for an image pickup element, etc.

Figure 1B:
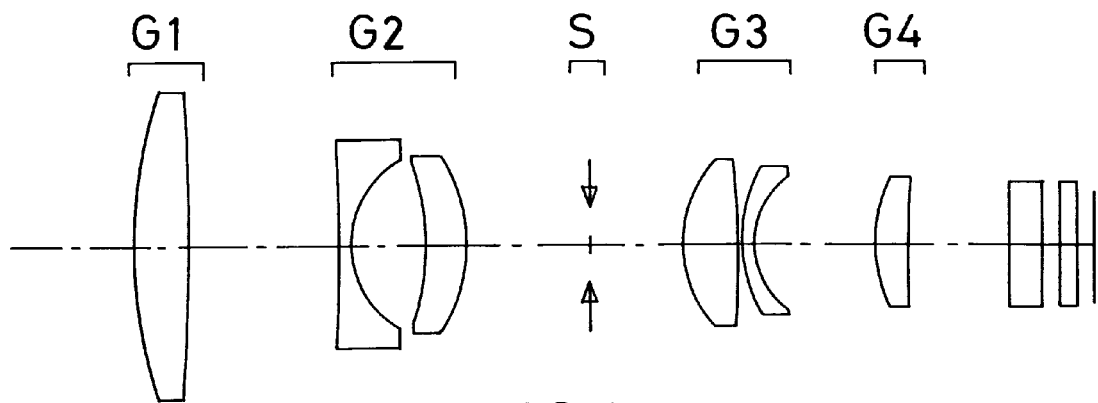
Figure 1C:
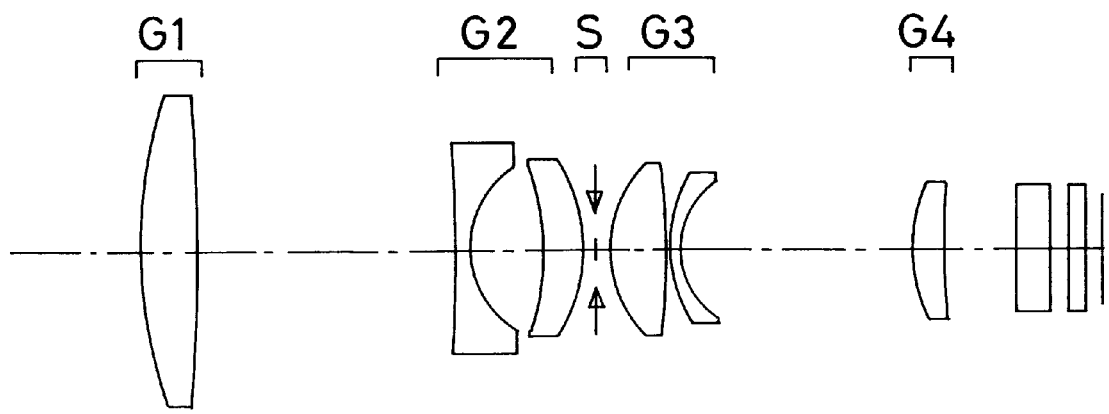

Example 1 is a 6:1 zoom lens system designed using an image pickup element having a pixel pitch of 5 μm. As shown in FIG. 1, a first lens group G1 is made up of a single double-convex positive lens having an aspherical surface on a side that faces an object. On this aspherical surface there is formed a diffractive surface. A second lens group G2 is made up of a double-concave negative lens and a positive meniscus lens convex on an image side thereof, two lenses in all. The positive meniscus lens has an aspherical surface on a side that faces an image. A third lens group G3 is made up of two lenses, i.e., a double-convex positive lens and a negative meniscus lens convex on an object side thereof. The double-convex positive lens has an aspherical surface on an object side thereof. The fourth lens group G4 is made up of a single positive meniscus lens that is convex on an object side thereof, and has an aspherical surface on the object side.

Figure 2:
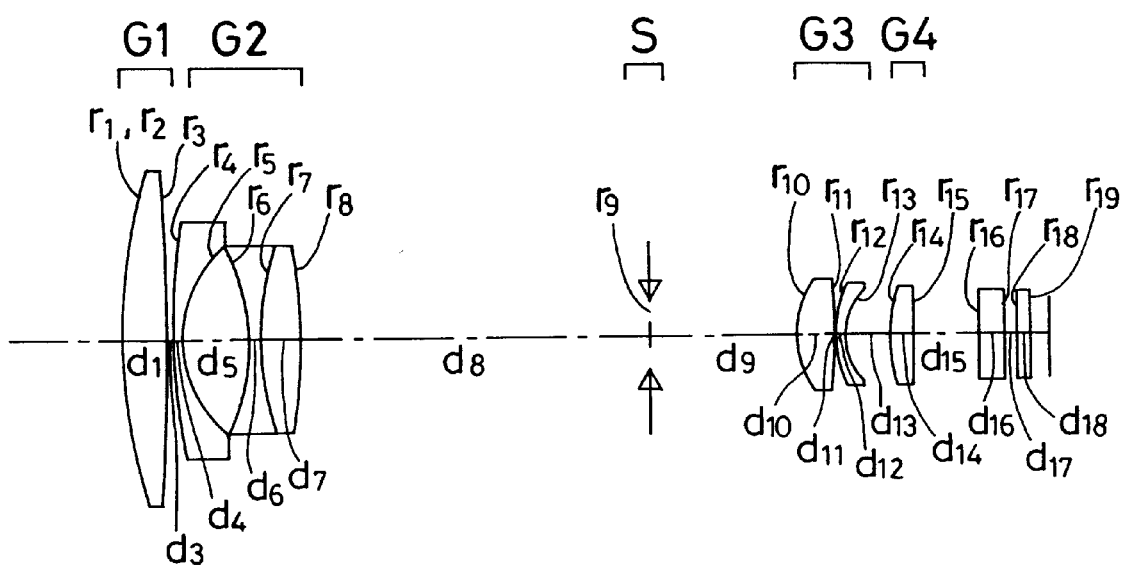
FIG. 2 is a sectional schematic, including an optical axis, of Example 2 of the inventive zoom lens system at a wide-angle end thereof.

Example 2, too, is directed to a 10:1 zoom lens system designed using an image pickup element having a pixel pitch of 5 μm. This example is different from Example 1 in that to make correction of aberration fluctuations associated with high zooming operation, a second lens group G2 is made up of two sub-groups or three lenses, as shown in FIG. 2. More specifically, a first lens group G1 is made up of a single double-convex positive lens having an aspherical surface on an object side thereof. On the aspherical surface there is formed a diffractive surface. The second lens group G2 is made up of two sub-groups or a negative meniscus lens convex on an object side thereof and a doublet consisting of a it double-concave lens and a double-convex lens. The doublet has an aspherical surface on an image side thereof. A third lens group G3 is made up of two lenses, i.e., a double-convex positive lens and a negative meniscus lens convex on an object side thereof. A fourth lens group G4 is made up of a single positive meniscus lens that is convex on an object side thereof, and has an aspherical surface on the object side.

Figure 3A:
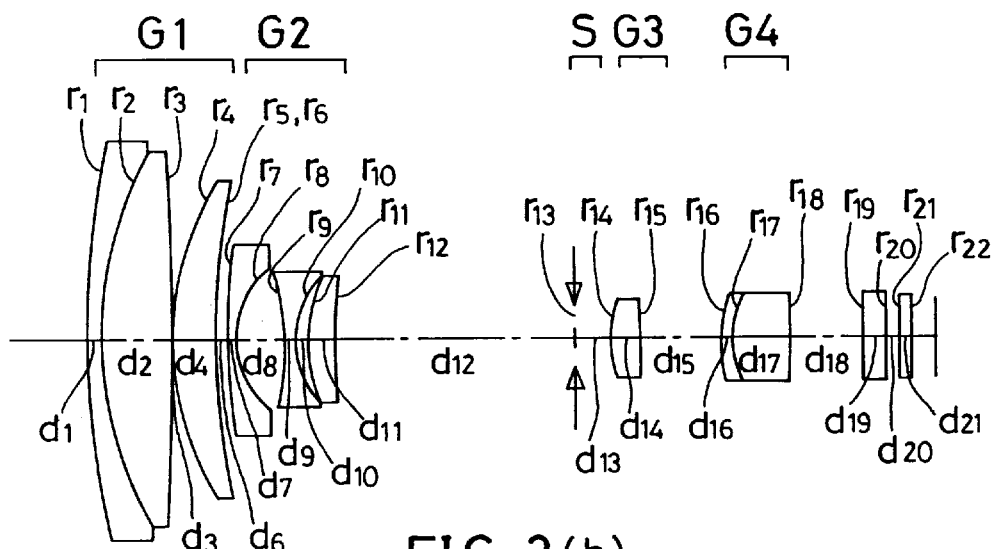
FIGS. 3(*a*), 3(*b*) and 3(*c*) are sectional schematics, including an optical axis, of Example 3 of the inventive zoom lens system at a wide-angle end (*a*) thereof, a standard setting (*b*) thereof and a telephoto end (*c*) thereof, respectively.
Figure 3B:
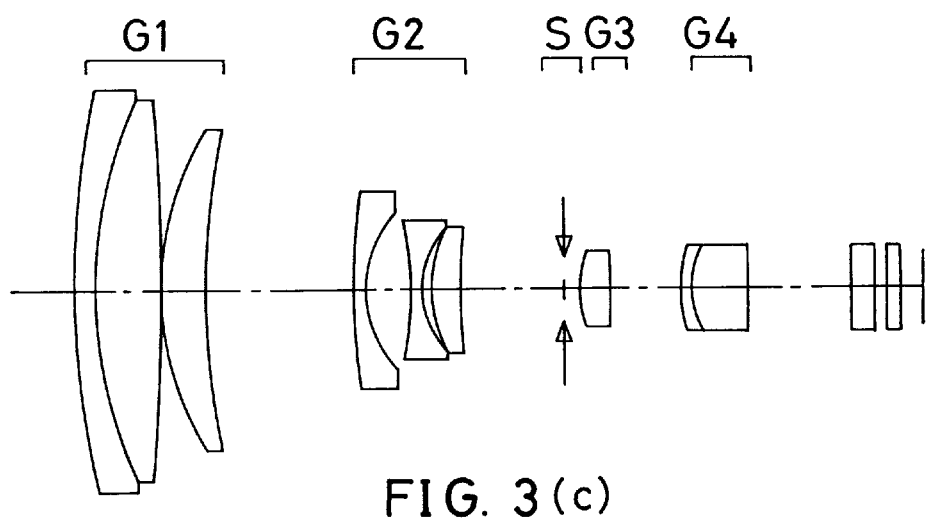
Figure 3C:
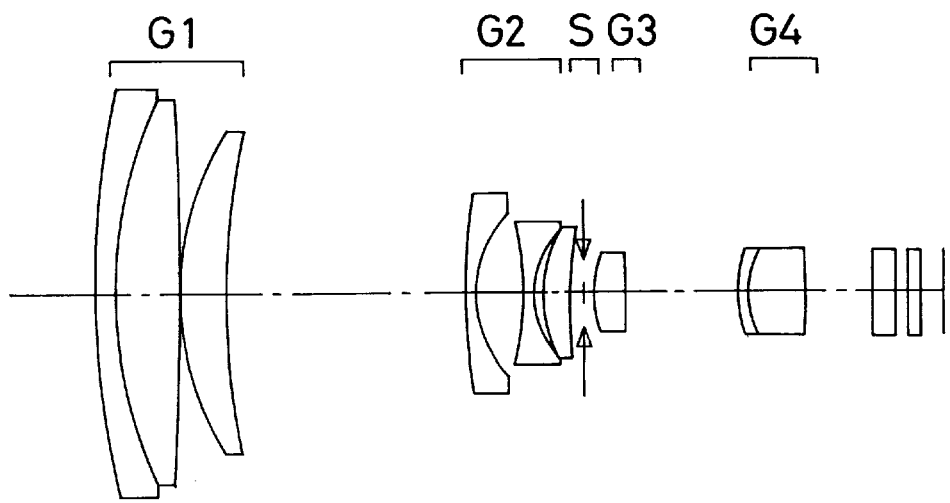

Example 3 is directed to a 10:1 zoom lens system constructed using an image pickup element having a pixel pitch of 3.5 μm. As shown in FIG. 3, a first lens group G1 is made up of two sub-groups or three lenses, i.e., a doublet consisting of a negative meniscus lens convex on an object side thereof and a double-convex lens, and a positive meniscus lens convex on the object side. A diffractive surface is formed on a surface of the positive meniscus lens that faces an image. A second lens group G2 is made up of three lenses, a negative meniscus lens convex on an object side thereof, a double-concave lens and a positive meniscus lens convex on the object side. A third lens group G3 is made up of a single double-convex positive lens that has an aspherical surface on an object side thereof. A fourth lens group G4 is made up of two lenses, a doublet consisting of a negative meniscus lens convex on an object side thereof and a double-convex positive lens, with a final surface therein defined by an aspherical surface. In this case, the surface of a substrate material forming the diffractive surface is defined by a spherical surface.

Figure 4:
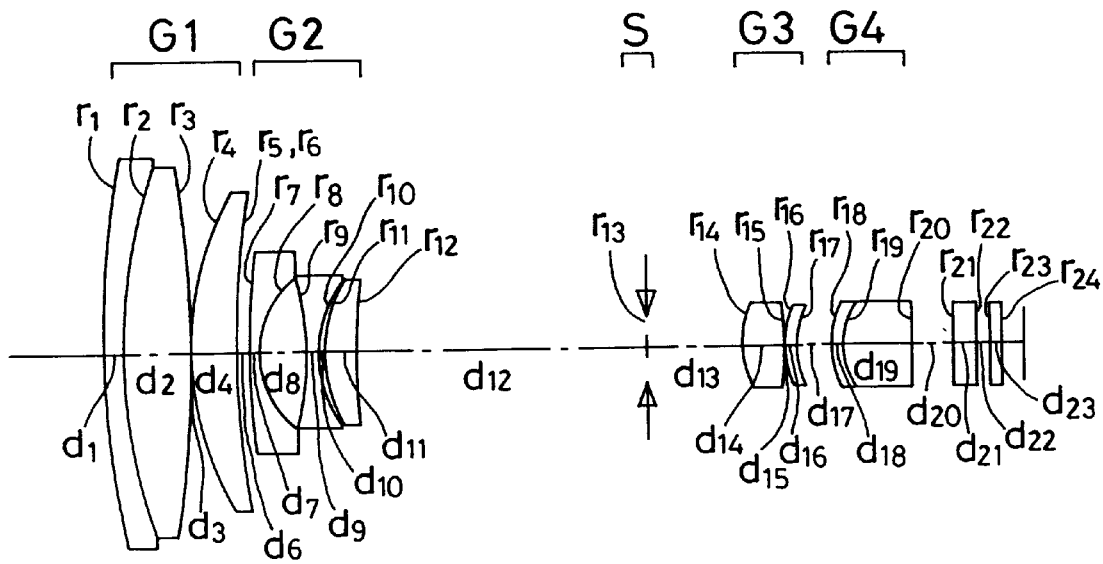
FIG. 4 is a sectional schematic, including an optical axis, of Example 4 of the inventive zoom lens system at a wide-angle end thereof.

Example 4, is also directed to a 10:1 zoom lens system constructed using an image pickup element having a pixel pitch of 3.5 μm. This example is different from Example 3 in that a third lens group G3 is made up of two sub-groups or two lenses, and a negative meniscus lens concave on an image side thereof is added to the third lens group G3, thereby achieving improved image quality. That is, a first lens group G1 is made up of two sub-groups or three lenses, i.e., a doublet consisting of a negative meniscus lens convex on an object side thereof and a double-convex positive lens, and a positive meniscus lens convex on the object side, as shown in FIG. 4. A second lens group G2 is made up of three lenses, a negative meniscus lens convex on an object side thereof, a double-concave lens and a positive meniscus lens convex on the object side. The third lens group G3 is made up of two sub-groups or three lenses, a double-convex positive lens and a negative meniscus lens convex on an object side thereof. The double-convex positive lens has an aspherical surface on an object side thereof. A fourth lens group G4 is made up of two lenses, a doublet consisting of a negative meniscus lens convex on an object side thereof and a positive meniscus lens convex on the object side, with a final surface therein defined by an aspherical surface. In this case, too, a substrate material forming the diffractive surface has a spherical surface.

Figure 5:
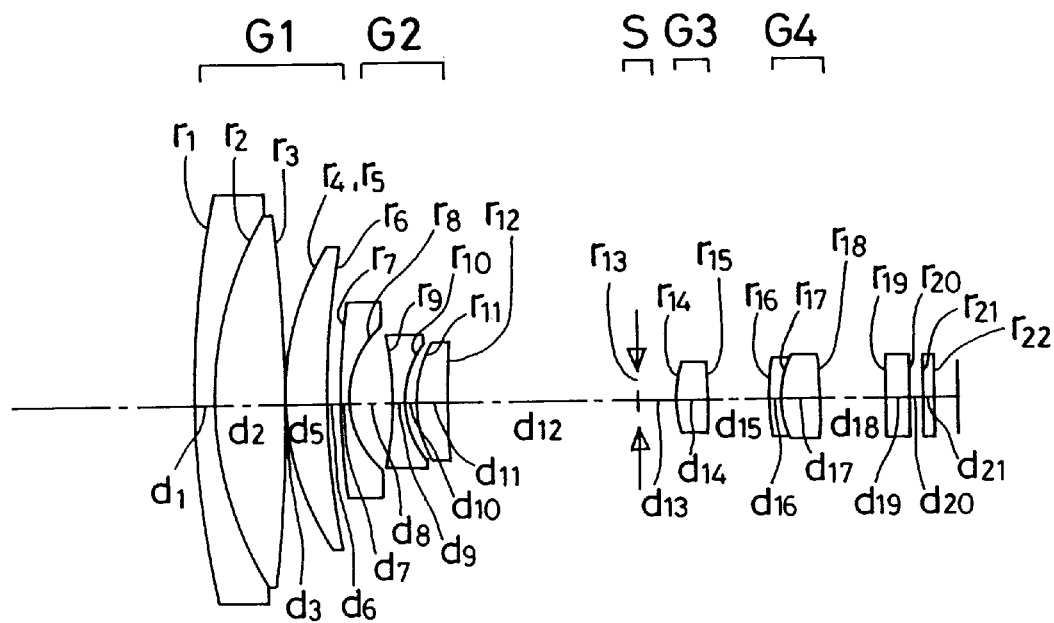
FIG. 5 is a sectional schematic, including an optical axis, of Example 5 of the inventive zoom lens system at a wide-angle end thereof.

Example 5, is directed to a 6:1 zoom lens system constructed using an image pickup element having a pixel pitch of 3.5 μm. This example is basically identical with Example 3 with the exception that an object-side surface of a third lens in a first lens group G1 is defined by a diffractive surface. A substrate material forming the diffractive surface has a spherical surface. That is, the first lens group G1 is made up of two sub-groups or three lenses, a doublet consisting of a negative meniscus lens convex on an object side thereof and a double-convex positive lens, and a positive meniscus lens convex on an object side thereof, as shown in FIG. 5. The diffractive surface is formed on a surface of the positive meniscus lens that faces an object. A second lens group G2 is made up of three lenses, a negative meniscus lens convex on an object side thereof, a double-concave lens and a positive meniscus lens convex on the object side. A third lens group G3 is made up of a single double-convex positive lens having an aspherical surface on an object side thereof. A fourth lens group G4 is made up of two lenses, a doublet consisting of a negative meniscus lens convex on object side thereof and a double-convex lens, with a final surface therein defined by an aspherical surface.

Figure 6:
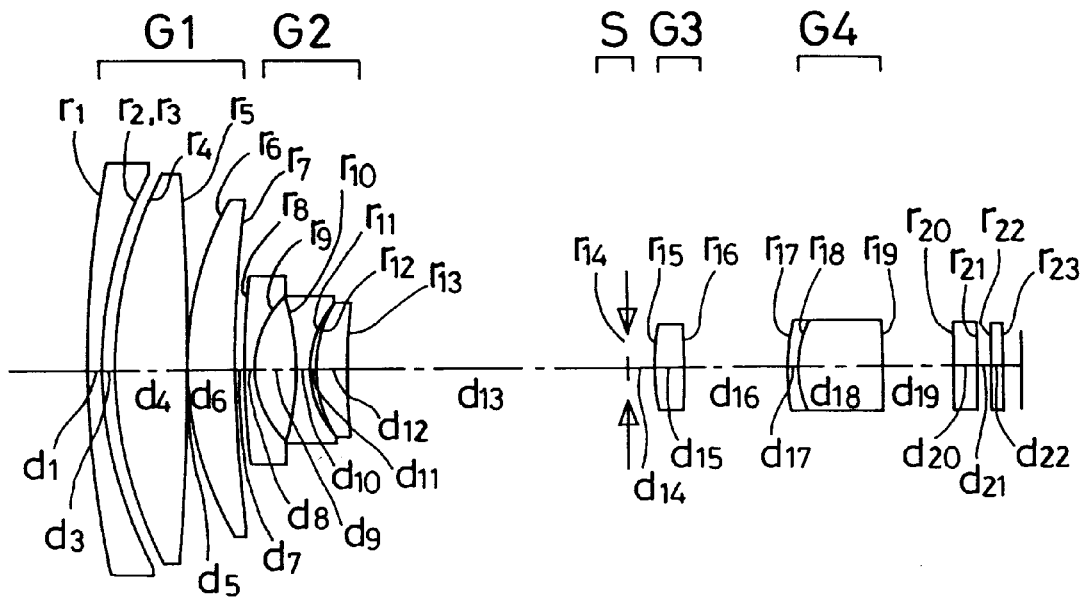
FIG. 6 is a sectional schematic, including an optical axis, of Example 6 of the inventive zoom lens system at a wide-angle end thereof.

Example 6, is directed to a 12:1 zoom lens system constructed using an image pickup element having a pixel pitch of 3.5 μm. In a first lens group G1, a first lens is separated from a second lens, and a diffractive surface is formed on a side of the first lens that faces an image. A surface of the substrate material is defined by a spherical surface. That is, the first lens group G1 is made up of three lenses, a negative meniscus lens convex on an object side thereof a double-convex positive lens and a positive meniscus lens convex on the object side, as shown in FIG. 6. A diffractive surface is formed on a surface of the negative meniscus lens that faces the image. A second lens group G2 is made up of three lenses, a negative meniscus lens convex on an object side thereof, a double-concave lens and a positive meniscus lens convex on the object side. A third lens group G3 is made up of a single positive meniscus lens that is convex on an object side thereof, and has an aspherical surface on an object-side surface thereof. A fourth lens group G4 is made up of two lenses, a doublet consisting of a negative meniscus lens convex on an object side thereof and a double-convex lens, with a final surface therein defined by an aspherical surface.

Figure 7:
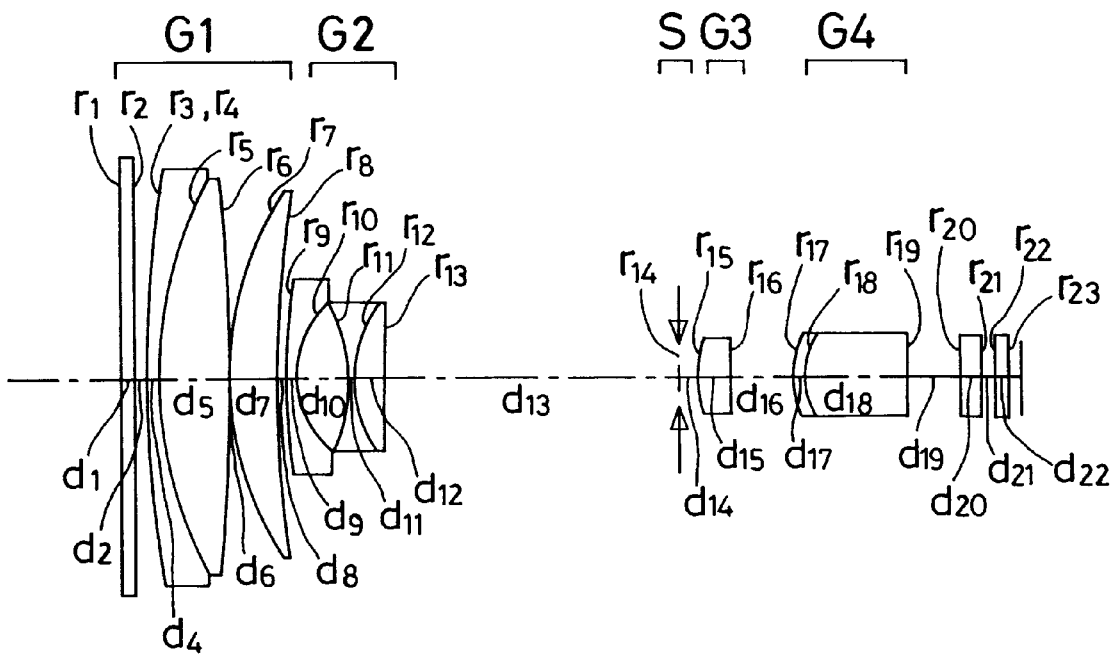
FIG. 7 is a sectional schematic, including an optical axis, of Example 7 of the inventive zoom lens system at a wide-angle end thereof.

Example 7, is directed to a 10:1 zoom lens system deigned using an image pickup element having a pixel pitch of 3.5 μm. A first lens group G1 is made up of two sub-groups or three lenses, wherein a surface of a first lens that faces an object is defined by a diffractive surface. If, in this case, the diffractive surface is open to the view, there is then a fear that its structure may break down when the user touches it. To avoid this, a protective glass for the diffractive surface is located nearest to the object side. This glass is in the form of a glass filter both surfaces of which are in plane forms. The first lens group G1 is made up of the glass filter both surfaces of which are in plane forms and two sub-groups or three lenses, i.e., a doublet consisting of a negative meniscus lens convex on an object side thereof and a double-concave lens, and a positive meniscus lens convex on an object side thereof, as shown in FIG. 7. The diffractive surface is formed on a surface of the doublet that faces an object. A second lens group G2 is made up of two sub-groups or three lenses, i.e., a negative meniscus lens convex on an object side thereof and a doublet consisting of a double-concave lens and a positive meniscus lens convex on an object side thereof. A third lens group G3 is made up of a single positive meniscus lens that is convex on an object side thereof, and has an aspherical surface on the object side. A fourth lens group G4 is made up of two lenses, a doublet consisting of a negative meniscus lens convex on an object side thereof and a positive meniscus lens convex on an object side thereof, with a final surface therein defined by an aspherical surface.

Figure 8A:
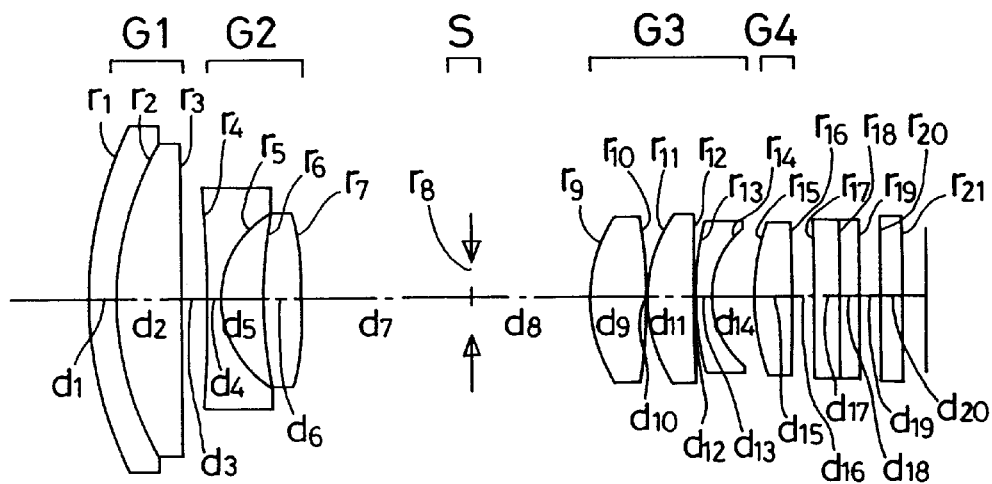
FIGS. 8(*a*), 8(*b*) and 8(*c*) are sectional schematics, including an optical axis, of Example 8 of the inventive zoom lens system at a wide-angle end (*a*) thereof, a standard setting (*b*) thereof and a telephoto end (*c*) thereof, respectively.
Figure 8B:
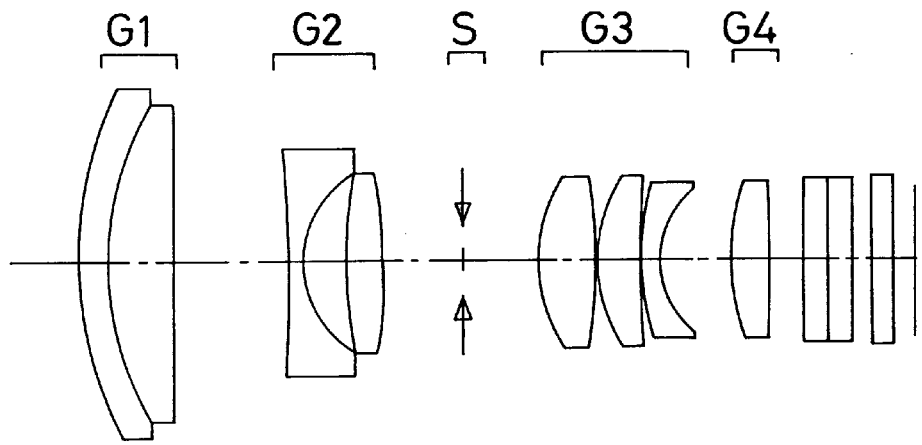
Figure 8C:
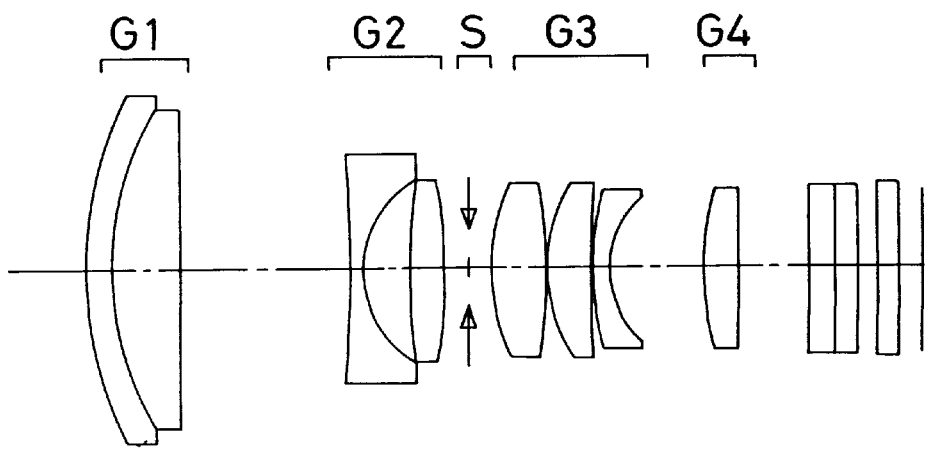

Example 8 is directed to a 3:1 zoom lens system constructed using an image pickup element having a pixel pitch of 4 μm. As shown in FIG. 8, a first lens group G1 is made up of two lenses, a doublet consisting of a negative meniscus lens convex on an object side thereof and a double-convex positive lens, and a second lens group G2 is made up of two sub-groups or two lenses, i.e., a double-concave negative lens and a plano-convex positive lens, with a final surface therein defined by an aspherical surface. A third lens group G3 is made up of three sub-groups or three lenses, a double-convex positive lens, a positive meniscus lens convex on an object side thereof and a negative meniscus lens convex on an object side thereof, with a surface nearest to the object side defined by an aspherical surface. A fourth lens group G4 is made up of a single positive meniscus lens convex on an object side thereof.

Examples 9 to 11, given later, are each designed such that when a DOE is used in a first lens group of the zoom lens system, the angle of incidence of a light beam on a diffractive surface is reduced as much as possible from a wide-angle end to a telephoto end thereof, thereby preventing any lowering of the primary diffraction efficiency of the DOE.

Figure 9A:
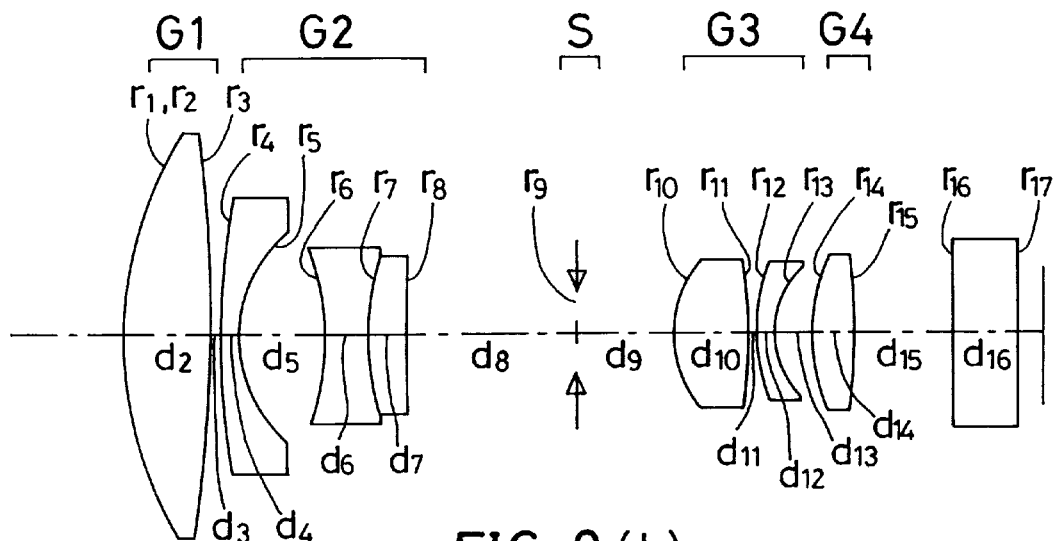
FIGS. 9(*a*), 9(*b*) and 9(*c*) are sectional schematics, including an optical axis, of Example 9 of the inventive zoom lens system at a wide-angle end (*a*) thereof, a standard setting (*b*) thereof and a telephoto end (*c*) thereof, respectively.
Figure 9B:
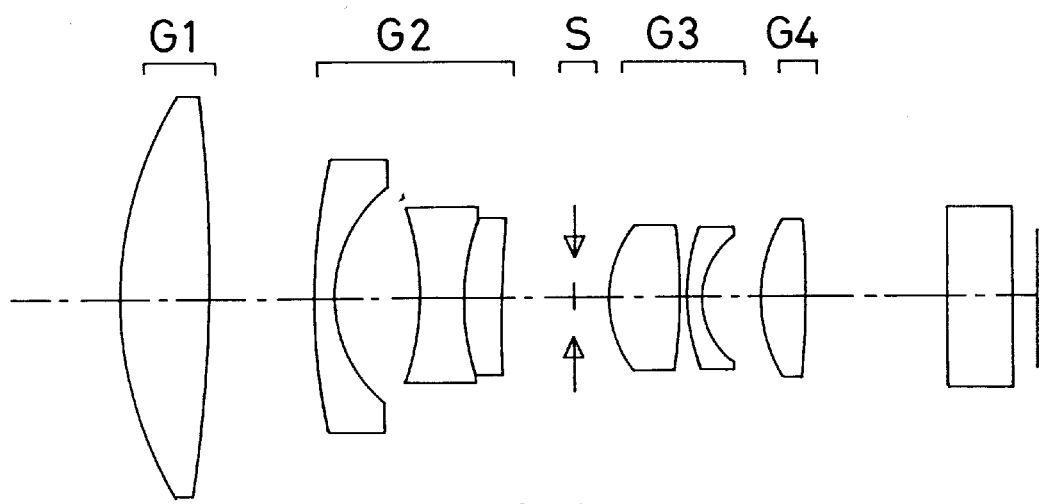
Figure 9C:
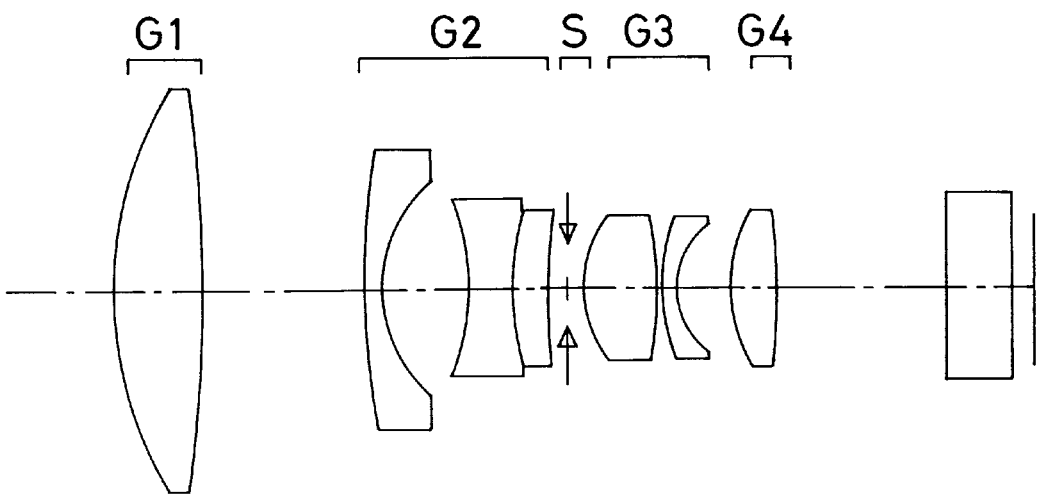

As shown in FIG. 9, a zoom lens system of Example 9 is made up, in order from an object side thereof, a first lens group G1 consisting of one double-convex positive lens, a second lens group G2 composed of a negative meniscus lens convex on an object side thereof, and a doublet consisting of a double-concave negative lens and a positive meniscus lens convex on an object side thereof, an aperture stop S, a third lens group G3 consisting of a double-convex positive lens and a negative meniscus lens convex on an object side thereof, and a fourth lens group G4 consisting of one double-concave positive lens. Aspherical surfaces are used, one at an object-side surface of the positive lens in the first lens group G1 and another at a surface located nearest to the object side in the third lens group G3. An object-side surface of the positive lens in the first lens group G1 is defined by a diffractive surface.

Figure 10:
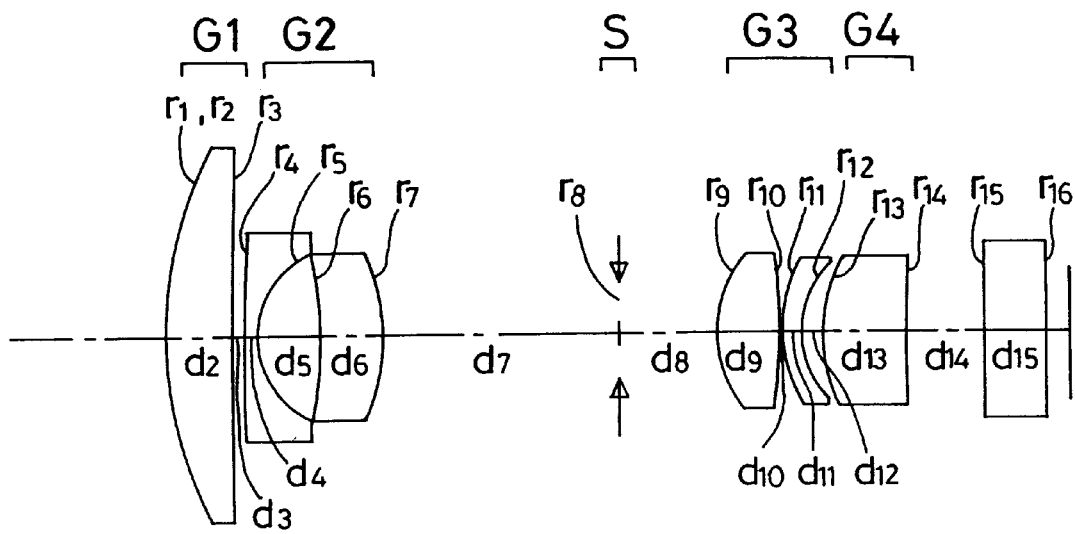
FIG. 10 is a sectional schematic, including an optical axis, of Example 10 of the inventive zoom lens system at a wide-angle end thereof.

As shown in FIG. 10, a zoom lens system of Example 10 is made up of, in order from an object side thereof, a first lens group G1 consisting of one positive meniscus lens convex on an object side thereof, a second lens group G2 consisting of a negative meniscus lens convex on an object side thereof and a positive meniscus lens convex on an object side thereof, a aperture stop S, a third lens group G3 consisting of a double-convex positive meniscus lens and a negative meniscus lens convex on an object side thereof, and a fourth lens group G4 consisting of one positive meniscus lens convex on an object side thereof. Aspherical surfaces are used, one at an object-side surface of the positive lens in the first lens group G1, one at a surface in the second lens group G2, which is located nearest to an image side thereof, one at a surface in the third lens group G3, which is located nearest to an object side thereof, and one at an object-side surface of the positive lens in the fourth lens group G4. An object-side surface of the positive lens in the first lens group G1 is defined by a diffractive surface.

In Example 9 or 10, the object-side surface of the positive lens in the first lens group G1 is defined by a diffractive surface. So far, it is usually required to use a plurality of lenses in a conventional first lens group G1 so as to make satisfactory correction for chromatic aberrations. According to these examples, however, the first lens group G1 can be constructed of one DOE to achieve a zoom ratio ranging from about 3 to about 10. Chromatic aberrations can also be well corrected. In addition, the angle of incidence of chief rays on the diffractive surface is kept very small from the wide-angle side to the telephoto side. Furthermore, since the surface nearest to the object side is defined by the diffractive surface, invariable performance can be obtained even when a cover glass is located between the diffractive surface and the object side or the diffractive surface is coated for the protection of the diffractive surface.

Figure 11:
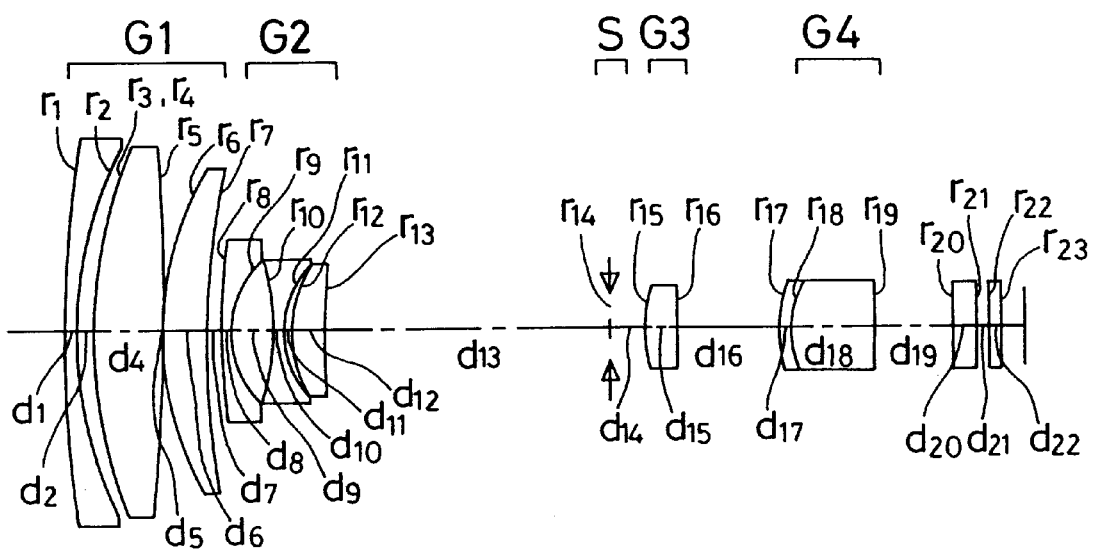
FIG. 11 is a sectional schematic, including an optical axis, of Example 11 of the inventive zoom lens system at a wide-angle end thereof.

As shown in FIG. 11, a zoom lens system of Example 11 is made up of, in order from an object side thereof, a first lens group G1 consisting of a negative meniscus lens convex on an object side thereof, a double-convex positive lens and a positive meniscus lens convex on an object side thereof, a second lens group G2 consisting of a negative meniscus lens convex on an object side thereof, a double-concave negative lens and a positive meniscus lens convex on an object side thereof, an aperture stop S, a third lens group G3 consisting of one positive meniscus lens convex on an object side thereof, and a fourth lens group G4 composed of a doublet consisting of a negative meniscus lens convex on an object side thereof and a double-convex lens. Aspherical surfaces are used, one at a surface in the third lens group G3, which is located nearest to an object side thereof, and one at a surface in the fourth lens group G4, which is located nearest to an image side thereof. A diffractive surface is provided at an object-side surface of the double-convex positive lens in the first lens group G1.

In the present invention, the diffractive surface is preferably used at the surface in the first lens group G1, which is located on the object side thereof. Referring here to the properties of the diffractive surface, it is known that its diffraction efficiency drops when the angle of incidence of light deviates from the design value. In an optical system such as the example of the invention, the angles of light rays directing to the center and periphery of the picture plane vary largely in the first lens group G1 because the field angle used is large. When the diffractive surface is used in the first lens group G1, it is thus required to take this problem into consideration. In other words, the diffractive surface should preferably be located at a surface where a change in the angle of incidence of light on the diffractive surface is reduced as much as possible. In the present invention, the object-side surface can meet such a condition.

The aforesaid problem, i.e., the drop of diffraction efficiency due to the oblique incidence of light on the diffractive surface arises depending not only on the angle of incidence of light but also on the ring pitch of the diffractive surface. In other words, the smaller the ring pitch, the more likely the diffraction efficiency is to drop. To satisfy condition (1) is, therefore, effective for prevention of the diffraction efficiency drop. Thus, the first object of satisfying condition (1) is to make correction for chromatic aberrations, and the second object of satisfying condition (1) is to avoid a diffraction efficiency drop due to the oblique incidence of light.

Enumerated below are numerical data concerning Examples 1 to 11. Symbols hereinafter used but not hereinbefore have the following means.

f . . . focal length $F_{NO}$ . . . F-number

2 ω . . . field angle $f_B$ . . . back focus $r_1, r_2$ . . . radii of curvature between adjacent lens surfaces $d_1, d_2$ . . . spaces between lens surfaces $n_{d1}, n_{d2}$ . . . d-line refractive indices of lenses $v_{d1}, v_{d2}$ . . . d-line Abbe's numbers of lenses The aspherical shape is represented by the aforesaid equation (a), and the diffractive surface is indicated by "Dif. surf."

Example 1 f = 5.00~12.27~30.00
$F_{NO}$ = 2.80~3.79~4.93
2ω = 65.67°~27.31°~11.44°
$f_B$ = 1.00~1.01~0.99

| | | | | | |
|---|---|---|---|---|---|
| $r_1$ = | 26.21213 | (Dif. surf.) | $d_1$ = 0.000 | $n_{d1}$ = 1001 | $v_{d1}$ = −3.45 |
| $r_2$ = | 26.21291 | (Aspheric) | $d_2$ = 3.300 | $n_{d2}$ = 1.69680 | $v_{d2}$ = 55.53 |
| $r_3$ = | −174.18100 | | $d_3$ = (Variable) | | |
| $r_4$ = | −78.44200 | | $d_4$ = 0.800 | $n_{d3}$ = 1.77250 | $v_{d3}$ = 49.60 |
| $r_5$ = | 5.41600 | | $d_5$ = 4.200 | | |

-continued

| | | | |
|---|---|---|---|
| $r_6 = -16.61800$ | $d_6 = 2.500$ | $n_{d4} = 1.72151$ | $\nu_{d4} = 29.23$ |
| $r_7 = -10.64800$ (Aspheric) | $d_7 = $ (Variable) | | |
| $r_8 = \infty$ (Stop) | $d_8 = $ (Variable) | | |
| $r_9 = 5.92500$ (Aspheric) | $d_9 = 3.300$ | $n_{d5} = 1.58913$ | $\nu_{d5} = 61.14$ |
| $r_{10} = -40.37400$ | $d_{10} = 0.200$ | | |
| $r_{11} = 9.32100$ | $d_{11} = 0.700$ | $n_{d6} = 1.84666$ | $\nu_{d6} = 23.78$ |
| $r_{12} = 4.65800$ | $d_{12} = $ (Variable) | | |
| $r_{13} = 9.97800$ (Aspheric) | $d_{13} = 1.700$ | $n_{d7} = 1.56384$ | $\nu_{d7} = 60.67$ |
| $r_{14} = 50.97800$ | $d_{14} = $ (Variable) | | |
| $r_{15} = \infty$ | $d_{15} = 2.000$ | $n_{d8} = 1.54771$ | $\nu_{d8} = 62.84$ |
| $r_{16} = \infty$ | $d_{16} = 1.000$ | | |
| $r_{17} = \infty$ | $d_{17} = 1.000$ | $n_{d9} = 1.51633$ | $\nu_{d9} = 64.84$ |
| $r_{18} = \infty$ | | | |

Zooming Spaces

| | | | |
|---|---|---|---|
| f | 5.00 | 12.27 | 30.00 |
| $d_3$ | 0.900 | 8.796 | 15.166 |
| $d_7$ | 15.066 | 7.190 | 0.800 |
| $d_8$ | 11.283 | 5.408 | 0.800 |
| $d_{12}$ | 1.000 | 7.042 | 13.334 |
| $d_{14}$ | 6.051 | 5.864 | 4.220 |

Aspherical Coefficients

1st surface $K = -1$
$A_4 = 3.96172 \times 10^{-9}$
$A_6 = 8.71770 \times 10^{-11}$
$A_8 = -4.68555 \times 10^{-13}$
$A_{10} = -1.55772 \times 10^{-14}$ 2nd surface $K = -1$
$A_4 = 2.38775 \times 10^{-9}$
$A_6 = 9.15960 \times 10^{-11}$
$A_8 = -5.10785 \times 10^{-13}$
$A_{10} = -1.50196 \times 10^{-14}$ 7th surface $K = 0$
$A_4 = -2.03510 \times 10^{-4}$
$A_6 = -4.96460 \times 10^{-6}$
$A_8 = 1.55580 \times 10^{-7}$
$A_{10} = -9.68280 \times 10^{-9}$ 9th surface $K = 0$
$A_4 = -4.50460 \times 10^{-4}$
$A_6 = -1.27430 \times 10^{-5}$
$A_8 = 3.22060 \times 10^{-7}$
$A_{10} = -1.97330 \times 10^{-8}$ 13th surface $K = 0$
$A_4 = -9.03520 \times 10^{-5}$
$A_6 = 2.03210 \times 10^{-6}$
$A_8 = -3.52070 \times 10^{-7}$
$A_{10} = 1.79220 \times 10^{-8}$
$f_{DOE} = 880.8926$
$N_{DOE} \sin\theta = -0.13 \sim 0.31$
$R_{DOE}/f_s = 2.14$
$f_s/f_2 = -1.1127$
$Z = 6$ Example 2

$f = 5.00 \sim 15.79 \sim 50.00$
$F_{NO} = 2.80 \sim 3.81 \sim 5.02$
$2\omega = 65.33° \sim 21.36° \sim 6.92°$
$f_B = 1.50 \sim 1.49 \sim 1.49$ -continued

| | | | | | |
|---|---|---|---|---|---|
| $r_1$ = | 42.99080 | (Dif. surf.) | $d_1$ = 0.000 | $n_{d1}$ = 1001 | $\nu_{d1}$ = -3.45 |
| $r_2$ = | 42.99264 | (Aspheric) | $d_2$ = 3.500 | $n_{d2}$ = 1.69680 | $\nu_{d2}$ = 55.53 |
| $r_3$ = | -322.69100 | | $d_3$ = (Variable) | | |
| $r_4$ = | 49.93000 | | $d_4$ = 0.800 | $n_{d3}$ = 1.77250 | $\nu_{d3}$ = 49.60 |
| $r_5$ = | 9.19400 | | $d_5$ = 5.600 | | |
| $r_6$ = | -15.42600 | | $d_6$ = 0.800 | $n_{d4}$ = 1.48749 | $\nu_{d4}$ = 70.23 |
| $r_7$ = | 22.82100 | | $d_7$ = 3.300 | $n_{d5}$ = 1.72151 | $\nu_{d5}$ = 29.23 |
| $r_8$ = | -55.26400 | (Aspheric) | $d_8$ = (Variable) | | |
| $r_9$ = | ∞ | (Stop) | $d_9$ = (Variable) | | |
| $r_{10}$ = | 6.63200 | (Aspheric) | $d_{10}$ = 3.000 | $n_{d6}$ = 1.67790 | $\nu_{d6}$ = 55.34 |
| $r_{11}$ = | -82.47800 | | $d_{11}$ = 0.150 | | |
| $r_{12}$ = | 10.44200 | | $d_{12}$ = 0.800 | $n_{d7}$ = 1.84666 | $\nu_{d7}$ = 23.78 |
| $r_{13}$ = | 5.04000 | | $d_{13}$ = (Variable) | | |
| $r_{14}$ = | 12.67400 | (Aspheric) | $d_{14}$ = 1.700 | $n_{d8}$ = 1.56384 | $\nu_{d8}$ = 60.67 |
| $r_{15}$ = | 69.48600 | | $d_{15}$ = (Variable) | | |
| $r_{16}$ = | ∞ | | $d_{16}$ = 2.000 | $n_{d9}$ = 1.54771 | $\nu_{d9}$ = 62.84 |
| $r_{17}$ = | ∞ | | $d_{17}$ = 1.000 | | |
| $r_{18}$ = | ∞ | | $d_{18}$ = 1.000 | $n_{d10}$ = 1.51633 | $\nu_{d10}$ = 64.14 |
| $r_{19}$ = | ∞ | | | | |

Zooming Spaces

| | | | |
|---|---|---|---|
| f | 5.00 | 15.79 | 50.00 |
| $d_3$ | 0.500 | 16.512 | 28.271 |
| $d_8$ | 28.571 | 12.559 | 0.800 |
| $d_9$ | 11.787 | 5.425 | 0.500 |
| $d_{13}$ | 3.488 | 9.904 | 16.400 |
| $d_{15}$ | 5.504 | 5.470 | 3.899 |

Aspherical Coefficients

1st surface

K = -1
$A_4$ = 6.92784 × $10^{-10}$
$A_6$ = -5.45288 × $10^{-12}$
$A_8$ = 4.74908 × $10^{-14}$
$A_{10}$ = 6.30011 × $10^{-16}$

2nd surface

K = -1
$A_4$ = 3.37381 × $10^{-10}$
$A_6$ = -3.92070 × $10^{-12}$
$A_8$ = 3.50452 × $10^{-14}$
$A_{10}$ = 6.75137 × $10^{-16}$

8th surface

K = 0
$A_4$ = -4.23840 × $10^{-5}$
$A_6$ = 9.70220 × $10^{-7}$
$A_8$ = -2.13030 × $10^{-8}$
$A_{10}$ = 1.89520 × $10^{-10}$

10th surface

K = 0
$A_4$ = -3.20730 × $10^{-4}$
$A_6$ = -4.98730 × $10^{-6}$
$A_8$ = 9.02550 × $10^{-9}$
$A_{10}$ = -4.37860 × $10^{-9}$

14th surface

K = 0
$A_4$ = -6.72570 × $10^{-5}$
$A_6$ = 7.44590 × $10^{-6}$
$A_8$ = -6.61450 × $10^{-7}$
$A_{10}$ = 2.43650 × $10^{-8}$
$f_{DOE}$ = 1004.5043
$N_{DOE} \sin\theta$ = -0.11~0.31
$R_{DOE}/f_s$ = 2.72
$f_s/f_2$ = -1.1927
Z = 10

Example 3

$f = 5.00\sim15.78\sim49.99$
$F_{NO} = 2.80\sim3.10\sim3.03$
$2\omega = 65.35°\sim21.58°\sim6.82°$
$f_B = 2.00\sim1.99\sim2.01$

| | | | | | | |
|---|---|---|---|---|---|---|
| $r_1 =$ | 75.88300 | | $d_1 = 1.400$ | | $n_{d1} = 1.84666$ | $\nu_{d1} = 23.78$ |
| $r_2 =$ | 34.38400 | | $d_2 = 5.700$ | | $n_{d2} = 1.72916$ | $\nu_{d2} = 54.68$ |
| $r_3 =$ | −298.50800 | | $d_3 = 0.150$ | | | |
| $r_4 =$ | 24.84400 | | $d_4 = 3.600$ | | $n_{d3} = 1.72916$ | $\nu_{d3} = 54.68$ |
| $r_5 =$ | 60.31897 | | $d_5 = 0.000$ | | $n_{d4} = 1001$ | $\nu_{d4} = -3.45$ |
| $r_6 =$ | 60.32093 | (Dif. surf.) | $d_6 =$ (Variable) | | | |
| $r_7 =$ | 57.95900 | | $d_7 = 0.900$ | | $n_{d5} = 1.83481$ | $\nu_{d5} = 42.72$ |
| $r_8 =$ | 8.60000 | | $d_8 = 4.000$ | | | |
| $r_9 =$ | −19.93300 | | $d_9 = 0.900$ | | $n_{d6} = 1.65160$ | $\nu_{d6} = 58.55$ |
| $r_{10} =$ | 7.99900 | | $d_{10} = 0.600$ | | | |
| $r_{11} =$ | 9.23300 | | $d_{11} = 2.500$ | | $n_{d7} = 1.84666$ | $\nu_{d7} = 23.78$ |
| $r_{12} =$ | 37.06800 | | $d_{12} =$ (Variable) | | | |
| $r_{13} =$ | ∞ | (Stop) | $d_{13} =$ (Variable) | | | |
| $r_{14} =$ | 12.49100 | (Aspheric) | $d_{14} = 2.500$ | | $n_{d8} = 1.48749$ | $\nu_{d8} = 70.23$ |
| $r_{15} =$ | −620.74000 | | $d_{15} =$ (Variable) | | | |
| $r_{16} =$ | 12.60000 | | $d_{16} = 0.900$ | | $n_{d9} = 1.84666$ | $\nu_{d9} = 23.78$ |
| $r_{17} =$ | 6.62300 | | $d_{17} = 4.800$ | | $n_{d10} = 1.65160$ | $\nu_{d10} = 58.55$ |
| $r_{18} =$ | −28.25100 | (Aspheric) | $d_{18} =$ (Variable) | | | |
| $r_{19} =$ | ∞ | | $d_{19} = 2.000$ | | $n_{d11} = 1.54771$ | $\nu_{d11} = 62.84$ |
| $r_{20} =$ | ∞ | | $d_{20} = 1.000$ | | | |
| $r_{21} =$ | ∞ | | $d_{21} = 1.000$ | | $n_{d12} = 1.51633$ | $\nu_{d12} = 64.14$ |
| $r_{22} =$ | ∞ | | | | | |

Zooming Spaces

| | | | |
|---|---|---|---|
| f | 5.00 | 15.78 | 49.99 |
| $d_6$ | 1.00 | 12.463 | 20.256 |
| $d_{12}$ | 20.256 | 8.793 | 1.000 |
| $d_{13}$ | 3.000 | 1.328 | 1.000 |
| $d_{15}$ | 6.719 | 5.911 | 9.358 |
| $d_{18}$ | 6.095 | 8.565 | 5.446 |

Aspherical Coefficients

6th surface $K = 0$
$A_4 = 2.08910 \times 10^{-10}$
$A_6 = 2.96073 \times 10^{-13}$
$A_8 = -8.85701 \times 10^{-16}$
$A_{10} = 0$ 14th surface $K = 0$
$A_4 = -1.24630 \times 10^{-4}$
$A_6 = 8.30640 \times 10^{-6}$
$A_8 = -9.25480 \times 10^{-7}$
$A_{10} = 3.77140 \times 10^{-8}$ 18th surface $K = 0$
$A_4 = 1.26480 \times 10^{-4}$
$A_6 = -1.05610 \times 10^{-6}$
$A_8 = 8.20250 \times 10^{-9}$
$A_{10} = -4.76000 \times 10^{-10}$
$f_{DOE} = 1856.3757$
$N_{DOE\ \sin\theta} = -0.0003\sim0.81$
$R_{DOE}/f_s = 3.82$
$f_s/f_2 = -2.147$
$Z = 10$

Example 4

$f = 5.00\sim15.82\sim50.00$
$F_{NO} = 2.80\sim3.24\sim3.94$
$2\omega = 65.23°\sim21.33°\sim6.89°$ -continued $f_B = 2.00\sim1.99\sim2.01$

| | | | | | |
|---|---|---|---|---|---|
| $r_1 =$ | 81.42000 | | $d_1 = 1.400$ | $n_{d1} = 1.84666$ | $\nu_{d1} = 23.78$ |
| $r_2 =$ | 42.10400 | | $d_2 = 5.700$ | $n_{d2} = 1.48749$ | $\nu_{d2} = 70.23$ |
| $r_3 =$ | −102.35500 | | $d_3 = 0.150$ | | |
| $r_4 =$ | 27.96600 | | $d_4 = 3.600$ | $n_{d3} = 1.72916$ | $\nu_{d3} = 54.68$ |
| $r_5 =$ | 71.43612 | | $d_5 = 0.000$ | $n_{d4} = 1001$ | $\nu_{d4} = -3.45$ |
| $r_6 =$ | 71.43781 | (Dif. surf.) | $d_6 =$ (Variable) | | |
| $r_7 =$ | 63.49900 | | $d_7 = 0.900$ | $n_{d5} = 1.83481$ | $\nu_{d5} = 42.72$ |
| $r_8 =$ | 8.60000 | | $d_8 = 4.000$ | | |
| $r_9 =$ | −19.06700 | | $d_9 = 0.900$ | $n_{d6} = 1.51742$ | $\nu_{d6} = 52.43$ |
| $r_{10} =$ | 8.99700 | | $d_{10} = 0.600$ | | |
| $r_{11} =$ | 10.45800 | | $d_{11} = 2.500$ | $n_{d7} = 1.84666$ | $\nu_{d7} = 23.78$ |
| $r_{12} =$ | 46.41000 | | $d_{12} =$ (Variable) | | |
| $r_{13} =$ | ∞ | (Stop) | $d_{13} =$ (Variable) | | |
| $r_{14} =$ | 7.06100 | (Aspheric) | $d_{14} = 3.300$ | $n_{d8} = 1.51633$ | $\nu_{d8} = 64.14$ |
| $r_{15} =$ | −51.87900 | | $d_{15} = 0.150$ | | |
| $r_{16} =$ | 11.10100 | | $d_{16} = 0.900$ | $n_{d9} = 1.69895$ | $\nu_{d9} = 30.13$ |
| $r_{17} =$ | 6.07000 | | $d_{17} =$ (Variable) | | |
| $r_{18} =$ | 8.27700 | | $d_{18} = 0.900$ | $n_{d10} = 1.84666$ | $\nu_{d10} = 23.78$ |
| $r_{19} =$ | 5.94700 | | $d_{19} = 5.700$ | $n_{d11} = 1.48749$ | $\nu_{d11} = 70.23$ |
| $r_{20} =$ | 1101.22900 | (Aspheric) | $d_{20} =$ (Variable) | | |
| $r_{21} =$ | ∞ | | $d_{21} = 2.000$ | $n_{d12} = 1.54771$ | $\nu_{d12} = 62.84$ |
| $r_{22} =$ | ∞ | | $d_{22} = 1.000$ | | |
| $r_{23} =$ | ∞ | | $d_{23} = 1.000$ | $n_{d13} = 1.51633$ | $\nu_{d13} = 64.14$ |
| $r_{24} =$ | ∞ | | | | |

Zooming Spaces

| f | 5.00 | 15.82 | 50.00 |
|---|---|---|---|
| $d_6$ | 1.000 | 15.236 | 24.141 |
| $d_{12}$ | 24.141 | 9.905 | 1.000 |
| $d_{13}$ | 7.886 | 5.198 | 1.000 |
| $d_{17}$ | 3.006 | 3.150 | 7.317 |
| $d_{20}$ | 3.287 | 5.820 | 5.852 |

Aspherical Coefficients

6th surface $K = 0$
$A_4 = 2.19617 \times 10^{-10}$
$A_6 = 3.64896 \times 10^{-13}$
$A_8 = -8.69690 \times 10^{-16}$
$A_{10} = 0$ 14th surface $K = 0$
$A_4 = -2.84890 \times 10^{-4}$
$A_6 = -2.63760 \times 10^{-6}$
$A_8 = -7.49700 \times 10^{-8}$
$A_{10} = 0$ 20th surface $K = 0$
$A_4 = 2.14090 \times 10^{-4}$
$A_6 = 8.40260 \times 10^{-7}$
$A_8 = -1.20580 \times 10^{-7}$
$A_{10} = 0$
$f_{DOE} = 3019.6686$
$N_{DOE} \sin\theta = -0.76\sim0.01$
$R_{DOE}/f_s = 4.52$
$f_s/f_2 = -1.6827$
$Z = 10$

Example 5

$f = 5.00 \sim 12.22 \sim 29.98$
$F_{NO} = 2.80 \sim 3.00 \sim 3.16$
$2\omega = 64.88° \sim 27.48° \sim 11.35°$
$f_B = 2.00 \sim 2.02 \sim 2.02$

| | | | | | | |
|---|---|---|---|---|---|---|
| $r_1 =$ | 84.46100 | | $d_1 = 1.400$ | | $n_{d1} = 1.84666$ | $\nu_{d1} = 23.78$ |
| $r_2 =$ | 28.94400 | | $d_2 = 5.700$ | | $n_{d2} = 1.70000$ | $\nu_{d2} = 48.08$ |
| $r_3 =$ | −174.42600 | | $d_3 = 0.150$ | | | |
| $r_4 =$ | 22.21669 | (Dif. surf.) | $d_4 = 0.000$ | | $n_{d3} = 1001$ | $\nu_{d3} = -3.45$ |
| $r_5 =$ | 22.21689 | | $d_5 = 3.600$ | | $n_{d4} = 1.72916$ | $\nu_{d4} = 54.68$ |
| $r_6 =$ | 67.26800 | | $d_6 =$ (Variable) | | | |
| $r_7 =$ | 53.85500 | | $d_7 = 0.900$ | | $n_{d5} = 1.72916$ | $\nu_{d5} = 54.68$ |
| $r_8 =$ | 8.60000 | | $d_8 = 3.600$ | | | |
| $r_9 =$ | −22.07700 | | $d_9 = 0.900$ | | $n_{d6} = 1.72916$ | $\nu_{d6} = 54.68$ |
| $r_{10} =$ | 7.54600 | | $d_{10} = 0.900$ | | | |
| $r_{11} =$ | 9.06000 | | $d_{11} = 2.500$ | | $n_{d7} = 1.84666$ | $\nu_{d7} = 23.78$ |
| $r_{12} =$ | 29.60000 | | $d_{12} =$ (Variable) | | | |
| $r_{13} =$ | ∞ | (Stop) | $d_{13} =$ (Variable) | | | |
| $r_{14} =$ | 11.07500 | (Aspheric) | $d_{14} = 2.500$ | | $n_{d8} = 1.48749$ | $\nu_{d8} = 70.23$ |
| $r_{15} =$ | −74.78800 | | $d_{15} =$ (Variable) | | | |
| $r_{16} =$ | 17.99900 | | $d_{16} = 0.900$ | | $n_{d9} = 1.84666$ | $\nu_{d9} = 23.78$ |
| $r_{17} =$ | 7.01500 | | $d_{17} = 3.300$ | | $n_{d10} = 1.72916$ | $\nu_{d10} = 54.68$ |
| $r_{18} =$ | −21.29300 | (Aspheric) | $d_{18} =$ (Variable) | | | |
| $r_{19} =$ | ∞ | | $d_{19} = 2.000$ | | $n_{d11} = 1.54771$ | $\nu_{d11} = 62.84$ |
| $r_{20} =$ | ∞ | | $d_{20} = 1.000$ | | | |
| $r_{21} =$ | ∞ | | $d_{21} = 1.000$ | | $n_{d12} = 1.51633$ | $\nu_{d12} = 64.14$ |
| $r_{22} =$ | ∞ | | | | | |

Zooming Spaces

| | | | |
|---|---|---|---|
| f | 5.00 | 12.22 | 29.98 |
| $d_6$ | 1.000 | 9.218 | 15.078 |
| $d_{12}$ | 16.078 | 7.860 | 2.000 |
| $d_{13}$ | 3.108 | 2.010 | 1.000 |
| $d_{15}$ | 5.136 | 4.621 | 5.801 |
| $d_{18}$ | 5.328 | 6.921 | 6.771 |

Aspherical Coefficients

4th surface $K = 0$
$A_4 = -2.35466 \times 10^{-10}$
$A_6 = -4.93500 \times 10^{-13}$
$A_8 = -7.16209 \times 10^{-16}$
$A_{10} = 0$ 14th surface $K = 0$
$A_4 = -2.44910 \times 10^{-4}$
$A_6 = 2.59080 \times 10^{-5}$
$A_8 = -4.16310 \times 10^{-6}$
$A_{10} = 2.43810 \times 10^{-7}$ 18th surface $K = 0$
$A_4 = 1.33310 \times 10^{-4}$
$A_6 = 1.09550 \times 10^{-6}$
$A_8 = -1.28370 \times 10^{-7}$
$A_{10} = 4.18020 \times 10^{-9}$
$f_{DOE} = 2467.9288$
$N_{DOE} \sin\theta = -0.26 \sim 0.28$
$R_{DOE}/f_s = 1.81$
$f_s/f_2 = -1.7527$
$Z = 6$

Example 6

$f = 5.00 \sim 17.30 \sim 59.99$
$F_{NO} = 2.88 \sim 3.14 \sim 3.00$
$2\omega = 65.57° \sim 21.48° \sim 5.68°$ -continued $f_B = 1.74\sim1.75\sim1.74$

| | | | | | | | |
|---|---|---|---|---|---|---|---|
| $r_1 =$ | 87.37100 | | $d_1 = 1.400$ | | $n_{d1} = 1.84666$ | $\nu_{d1} = 23.78$ |
| $r_2 =$ | 35.26612 | | $d_2 = 0.000$ | | $n_{d2} = 1001$ | $\nu_{d2} = -3.45$ |
| $r_3 =$ | 35.26663 | (Dif. surf.) | $d_3 = 1.000$ | | | |
| $r_4 =$ | 36.75200 | | $d_4 = 6.000$ | | $n_{d3} = 1.73400$ | $\nu_{d3} = 51.47$ |
| $r_5 =$ | -257.30500 | | $d_5 = 0.150$ | | | |
| $r_6 =$ | 27.66300 | | $d_6 = 3.600$ | | $n_{d4} = 1.71300$ | $\nu_{d4} = 53.87$ |
| $r_7 =$ | 78.85700 | | $d_7 = $ (Variable) | | | |
| $r_8 =$ | 58.82500 | | $d_8 = 0.900$ | | $n_{d5} = 1.83481$ | $\nu_{d5} = 42.72$ |
| $r_9 =$ | 8.60000 | | $d_9 = 3.600$ | | | |
| $r_{10} =$ | -17.36000 | | $d_{10} = 0.900$ | | $n_{d6} = 1.62041$ | $\nu_{d6} = 60.29$ |
| $r_{11} =$ | 8.37400 | | $d_{11} = 0.500$ | | | |
| $r_{12} =$ | 9.51500 | | $d_{12} = 2.500$ | | $n_{d7} = 1.84666$ | $\nu_{d6} = 23.78$ |
| $r_{13} =$ | 40.93800 | | $d_{13} = $ (Variable) | | | |
| $r_{14} =$ | ∞ | (Stop) | $d_{14} = $ (Variable) | | | |
| $r_{15} =$ | 12.73000 | (Aspheric) | $d_{15} = 2.500$ | | $n_{d8} = 1.48749$ | $\nu_{d8} = 70.23$ |
| $r_{16} =$ | 1199.04500 | | $d_{16} = $ (Variable) | | | |
| $r_{17} =$ | 13.05000 | | $d_{17} = 0.900$ | | $n_{d9} = 1.84666$ | $\nu_{d9} = 23.78$ |
| $r_{18} =$ | 6.75500 | | $d_{18} = 7.000$ | | $n_{d10} = 1.69680$ | $\nu_{d10} = 55.53$ |
| $r_{19} =$ | -54.28400 | (Aspheric) | $d_{19} = $ (Variable) | | | |
| $r_{20} =$ | ∞ | | $d_{20} = 2.000$ | | $n_{d11} = 1.54771$ | $\nu_{d11} = 62.84$ |
| $r_{21} =$ | ∞ | | $d_{21} = 1.000$ | | | |
| $r_{22} =$ | ∞ | | $d_{22} = 1.000$ | | $n_{d12} = 1.51633$ | $\nu_{d12} = 64.14$ |
| $r_{23} =$ | ∞ | | | | | |

Zooming Spaces

| | | | |
|---|---|---|---|
| f | 5.00 | 17.30 | 59.99 |
| $d_7$ | 1.000 | 14.797 | 23.697 |
| $d_{13}$ | 23.697 | 9.900 | 1.000 |
| $d_{14}$ | 2.111 | 1.000 | 1.000 |
| $d_{16}$ | 8.655 | 6.586 | 10.966 |
| $d_{19}$ | 5.865 | 9.045 | 4.665 |

Aspherical Coefficients

3rd surface $K = 0$
$A_4 = 1.32083 \times 10^{-10}$
$A_6 = 6.04192 \times 10^{-14}$
$A_8 = -3.02923 \times 10^{-17}$
$A_{10} = 0$ 15th surface $K = 0$
$A_4 = -1.02710 \times 10^{-4}$
$A_6 = 7.65750 \times 10^{-6}$
$A_8 = -8.07420 \times 10^{-7}$
$A_{10} = 3.02630 \times 10^{-8}$ 19th surface $K = 0$
$A_4 = 1.20220 \times 10^{-4}$
$A_6 = 2.40950 \times 10^{-6}$
$A_8 = -2.47940 \times 10^{-7}$
$A_{10} = 7.00690 \times 10^{-9}$
$f_{DOE} = 2438.6612$
$N_{DOE \sin\theta} = -0.42\sim0.03$
$R_{DOE}/f_s = 2.04$
$f_s/f_2 = -2.269$
$Z = 12$ Example 7

$f = 5.00\sim15.78\sim50.04$
$F_{NO} = 3.06\sim3.33\sim2.80$
$2\omega = 65.66°\sim21.48°\sim6.81°$
$f_B = 1.00\sim0.99\sim0.99$

| | | | | | |
|---|---|---|---|---|---|
| $r_1 =$ | ∞ | $d_1 = 1.000$ | $n_{d1} = 1.51633$ | $\nu_{d1} = 64.14$ |
| $r_2 =$ | ∞ | $d_2 = 1.000$ | | |

-continued

| | | | | | |
|---|---|---|---|---|---|
| $r_3 =$ | 106.25102 | (Dif. surf.) $d_3 = 0.000$ | $n_{d2} = 1001$ | $v_{d3} = -3.45$ |
| $r_4 =$ | 106.25555 | $d_4 = 1.400$ | $n_{d3} = 1.84666$ | $v_{d3} = 23.78$ |
| $r_5 =$ | 34.45000 | $d_5 = 5.700$ | $n_{d4} = 1.72000$ | $v_{d4} = 43.69$ |
| $r_6 =$ | −194.97600 | $d_6 = 0.150$ | | |
| $r_7 =$ | 27.03900 | $d_7 = 3.600$ | $n_{d5} = 1.72916$ | $v_{d5} = 54.68$ |
| $r_8 =$ | 68.64600 | $d_8 =$ (Variable) | | |
| $r_9 =$ | 57.82100 | $d_9 = 0.900$ | $n_{d6} = 1.83481$ | $v_{d6} = 42.72$ |
| $r_{10} =$ | 8.60000 | $d_{10} = 4.000$ | | |
| $r_{11} =$ | −14.74900 | $d_{11} = 0.900$ | $n_{d7} = 1.62041$ | $v_{d7} = 60.29$ |
| $r_{12} =$ | 11.05600 | $d_{12} = 2.500$ | $n_{d8} = 1.84666$ | $v_{d8} = 23.78$ |
| $r_{13} =$ | 161.49400 | (Aspheric) $d_{13} =$ (Variable) | | |
| $r_{14} =$ | ∞ | (Stop) $d_{14} =$ (Variable) | | |
| $r_{15} =$ | 10.59300 | (Aspheric) $d_{15} = 2.500$ | $n_{d9} = 1.48749$ | $v_{d9} = 70.23$ |
| $r_{16} =$ | 40.14300 | $d_{16} =$ (Variable) | | |
| $r_{17} =$ | 10.20000 | $d_{17} = 0.900$ | $n_{d10} = 1.84666$ | $v_{d10} = 23.78$ |
| $r_{18} =$ | 5.73400 | $d_{18} = 8.400$ | $n_{d11} = 1.72916$ | $v_{d11} = 54.68$ |
| $r_{19} =$ | 100.98700 | (Aspheric) $d_{19} =$ (Variable) | | |
| $r_{20} =$ | ∞ | $d_{20} = 2.000$ | $n_{d11} = 1.54771$ | $v_{d11} = 62.84$ |
| $r_{21} =$ | ∞ | $d_{21} = 1.000$ | | |
| $r_{22} =$ | ∞ | $d_{22} = 1.000$ | $n_{d12} = 1.51633$ | $v_{d12} = 64.14$ |
| $r_{23} =$ | ∞ | | | |

Zooming Spaces

| | | | |
|---|---|---|---|
| f | 5.00 | 15.78 | 50.04 |
| $d_8$ | 1.000 | 14.563 | 24.646 |
| $d_{13}$ | 24.646 | 11.083 | 1.000 |
| $d_{14}$ | 1.600 | 1.000 | 3.177 |
| $d_{16}$ | 5.509 | 3.974 | 5.934 |
| $d_{19}$ | 4.319 | 6.441 | 2.318 |

Aspherical Coefficients

3rd surface $K = 0$
$A_4 = -1.62056 \times 10^{-10}$
$A_6 = 9.86207 \times 10^{-15}$
$A_8 = 9.87197 \times 10^{-17}$
$A_{10} = 0$ 13th surface $K = 0$
$A_4 = -8.76830 \times 10^{-6}$
$A_6 = 1.64780 \times 10^{-6}$
$A_8 = -1.55480 \times 10^{-8}$
$A_{10} = 0$ 15th surface $K = 0$
$A_4 = -1.17210 \times 10^{-4}$
$A_6 = 8.40830 \times 10^{-6}$
$A_8 = -7.78930 \times 10^{-7}$
$A_{10} = 2.77310 \times 10^{-8}$ 19th surface $K = 0$
$A_4 = 4.19930 \times 10^{-4}$
$A_6 = 5.07070 \times 10^{-6}$
$A_8 = -2.97780 \times 10^{-7}$
$A_{10} = 6.33600 \times 10^{-9}$
$f_{DOE} = 2492.2209$
$N_{DOE} \sin\theta = -0.06 \sim 0.42$
$R_{DOE}/f_s = 6.72$
$f_s/f_2 = -1.85$
$Z = 10.01$ Example 8

$f = 5.51 \sim 9.53 \sim 15.82$
$F_{NO} = 2.80 \sim 3.36 \sim 4.35$
$2\omega = 66.80° \sim 38.66° \sim 23.87°$
$f_B = 1.11 \sim 1.11 \sim 1.11$ -continued

| | | | | |
|---|---|---|---|---|
| $r_1 =$ | 19.09000 | $d_1 = 1.200$ | $n_{d1} = 1.84666$ | $\nu_{d1} = 23.78$ |
| $r_2 =$ | 14.75200 | $d_2 = 3.100$ | $n_{d2} = 1.60311$ | $\nu_{d2} = 60.64$ |
| $r_3 =$ | −7692.38700 | $d_3 =$ (Variable) | | |
| $r_4 =$ | −76.43900 | $d_4 = 0.840$ | $n_{d3} = 1.77250$ | $\nu_{d3} = 49.60$ |
| $r_5 =$ | 4.86000 | $d_5 = 1.810$ | | |
| $r_6 =$ | 18.28100 | $d_6 = 1.760$ | $n_{d4} = 1.80518$ | $\nu_{d4} = 25.42$ |
| $r_7 =$ | ∞ (Aspheric) | $d_7 =$ (Variable) | | |
| $r_8 =$ | ∞ (Stop) | $d_8 =$ (Variable) | | |
| $r_9 =$ | 7.34000 (Aspheric) | $d_9 = 2.640$ | $n_{d5} = 1.58913$ | $\nu_{d5} = 61.18$ |
| $r_{10} =$ | −22.12100 | $d_{10} = 0.150$ | | |
| $r_{11} =$ | 8.02400 | $d_{11} = 1.970$ | $n_{d6} = 1.72916$ | $\nu_{d6} = 54.68$ |
| $r_{12} =$ | 52.49300 | $d_{12} = 0.150$ | | |
| $r_{13} =$ | 14.04200 | $d_{13} = 0.700$ | $n_{d7} = 1.84666$ | $\nu_{d7} = 23.78$ |
| $r_{14} =$ | 4.08000 | $d_{14} =$ (Variable) | | |
| $r_{15} =$ | 10.18200 (Aspheric) | $d_{15} = 1.740$ | $n_{d8} = 1.58913$ | $\nu_{d8} = 61.14$ |
| $r_{16} =$ | 1133.03300 | $d_{16} =$ (Variable) | | |
| $r_{17} =$ | ∞ | $d_{17} = 1.200$ | $n_{d9} = 1.54771$ | $\nu_{d9} = 62.84$ |
| $r_{18} =$ | ∞ | $d_{18} = 1.000$ | $n_{d10} = 1.51633$ | $\nu_{d10} = 64.14$ |
| $r_{19} =$ | ∞ | $d_{19} = 1.000$ | | |
| $r_{20} =$ | ∞ | $d_{20} = 1.000$ | $n_{d11} = 1.51633$ | $\nu_{d11} = 64.14$ |
| $r_{21} =$ | ∞ | | | |

| Zooming Spaces | | | |
|---|---|---|---|
| f | 5.51 | 9.53 | 15.82 |
| $d_3$ | 1.157 | 5.471 | 8.096 |
| $d_7$ | 8.238 | 3.924 | 1.300 |
| $d_8$ | 5.647 | 3.626 | 0.936 |
| $d_{14}$ | 2.073 | 3.422 | 4.464 |
| $d_{16}$ | 0.994 | 1.664 | 3.314 |

Aspherical Coefficients

7th surface $K = 0$
$A_4 = -5.81460 \times 10^{-4}$
$A_6 = -3.52560 \times 10^{-7}$
$A_8 = -1.11000 \times 10^{-6}$
$A_{10} = 9.72160 \times 10^{-9}$ 9th surface $K = -0.2184$
$A_4 = -5.15060 \times 10^{-4}$
$A_6 = -2.27070 \times 10^{-6}$
$A_8 = 2.56860 \times 10^{-7}$
$A_{10} = -1.04820 \times 10^{-8}$ 15th surface $K = 0$
$A_4 = -2.26300 \times 10^{-4}$
$A_6 = 1.77630 \times 10^{-5}$
$A_8 = -1.50960 \times 10^{-6}$
$A_{10} = 9.37660 \times 10^{-8}$ Example 9

$f = 5.010 \sim 10.10 \sim 15.000$
$F_{NO} = 2.8 \sim 3.5 \sim 3.9$
$2\omega = 62.8° \sim 33.7° \sim 23.1°$

| | | | | |
|---|---|---|---|---|
| $r_1 =$ | 16.906325 (Dif. surf.) | $d_1 = 0.00$ | $n_{d1} = 1001.00$ | $\nu_{d1} = -3.45$ |
| $r_2 =$ | 16.906675 (Aspheric) | $d_2 = 3.71$ | $n_{d2} = 1.49241$ | $\nu_{d2} = 57.66$ |
| $r_3 =$ | −78.405 | $d_3$ (Variable) | | |
| $r_4 =$ | 39.186 | $d_4 = 0.75$ | $n_{d3} = 1.72916$ | $\nu_{d3} = 54.68$ |
| $r_5 =$ | 6.205 | $d_5 = 3.98$ | | |
| $r_6 =$ | −10.310 | $d_6 = 1.80$ | $n_{d4} = 1.48749$ | $\nu_{d4} = 70.23$ |
| $r_7 =$ | 10.993 | $d_7 = 1.70$ | $n_{d5} = 1.84666$ | $\nu_{d5} = 23.78$ |
| $r_8 =$ | 40.312 | $d_8 =$ (Variable) | | |
| $r_9 =$ | ∞ (Stop) | $d_9 =$ (Variable) | | |
| $r_{10} =$ | 4.771 (Aspheric) | $d_{10} = 3.21$ | $n_{d6} = 1.58913$ | $\nu_{d6} = 61.14$ |
| $r_{11} =$ | −20.336 | $d_{11} = 0.25$ | | |

-continued

| | | | | | | |
|---|---|---|---|---|---|---|
| $r_{12} =$ | 10.652 | | $d_{12} = 0.77$ | | $n_{d7} = 1.84666$ | $v_{d7} = 23.78$ |
| $r_{13} =$ | 3.904 | | $d_{13} =$ (Variable) | | | |
| $r_{14} =$ | 8.125 | | $d_{14} = 1.86$ | | $n_{d8} = 1.69680$ | $v_{d8} = 55.53$ |
| $r_{15} =$ | −43.414 | | $d_{15} =$ (Variable) | | | |
| $r_{16} =$ | ∞ | | $d_{16} = 2.88$ | | $n_{d9} = 1.51633$ | $v_{d9} = 64.14$ |
| $r_{17} =$ | ∞ | | | | | |

Zooming Spaces

| | | | |
|---|---|---|---|
| f | 5.010 | 10.10 | 15.000 |
| $d_3$ | 0.549 | 4.941 | 7.304 |
| $d_8$ | 7.598 | 3.205 | 0.842 |
| $d_9$ | 4.464 | 1.572 | 0.800 |
| $d_{13}$ | 1.615 | 2.544 | 2.330 |
| $d_{15}$ | 4.37 | 6.23 | 7.42 |

Aspherical Coefficients

1st surface $K = -1.00$
$A_4 = -2.8905 \times 10^{-9}$
$A_6 = -1.1938 \times 10^{-10}$
$A_8 = -4.7162 \times 10^{-12}$
$A_{10} = -3.2002 \times 10^{-13}$ 2nd surface $K = -1.00$
$A_4 = -9.1357 \times 10^{-9}$
$A_6 = -6.1599 \times 10^{-11}$
$A_8 = -5.5528 \times 10^{-12}$
$A_{10} = -3.0975 \times 10^{-13}$ 10th surface $K = 0.00$
$A_4 = -1.2117 \times 10^{-3}$
$A_6 = -4.3851 \times 10^{-7}$
$A_8 = -3.6450 \times 10^{-6}$
$A_{10} = 1.1675 \times 10^{-7}$
$f_{DOE} = 816.8517$
$N_{DOE} \sin\theta = -0.14 \sim 0.13$
$R_{DOE}/f_s = 1.95$
$f_s/f_2 = -1.27$
$Z = 2.99$ Example 10

$f = 5.010 \sim 10.01 \sim 15.000$
$F_{NO} = 2.8 \sim 3.3 \sim 3.7$
$2\omega = 62.8° \sim 34.0° \sim 23.1°$

| | | | | | | |
|---|---|---|---|---|---|---|
| $r_1 =$ | 20.681757 | (Dif. surf.) | $d_1 = 0.00$ | | $n_{d1} = 1001.00$ | $v_{d1} = -3.45$ |
| $r_2 =$ | 20.681952 | (Aspheric) | $d_2 = 2.90$ | | $n_{d2} = 1.69400$ | $v_{d2} = 56.29$ |
| $r_3 =$ | 161.088 | | $d_3 =$ (Variable) | | | |
| $r_4 =$ | 73.400 | | $d_4 = 0.75$ | | $n_{d3} = 1.77250$ | $v_{d3} = 49.60$ |
| $r_5 =$ | 4.350 | | $d_5 = 2.86$ | | | |
| $r_6 =$ | −19.550 | | $d_6 = 3.10$ | | $n_{d4} = 1.72250$ | $v_{d4} = 29.23$ |
| $r_7 =$ | −11.213 | (Aspheric) | $d_7 =$ (Variable) | | | |
| $r_8 =$ | ∞ | (Stop) | $d_8 =$ (Variable) | | | |
| $r_9 =$ | 5.271 | (Aspheric) | $d_9 = 2.94$ | | $n_{d5} = 1.58913$ | $v_{d5} = 61.14$ |
| $r_{10} =$ | −22.356 | | $d_{10} = 0.25$ | | | |
| $r_{11} =$ | 9.604 | | $d_{11} = 0.70$ | | $n_{d6} = 1.84666$ | $v_{d6} = 23.78$ |
| $r_{12} =$ | 4.188 | | $d_{12} =$ (Variable) | | | |
| $r_{13} =$ | 7.579 | (Aspheric) | $d_{13} = 3.96$ | | $n_{d7} = 1.56384$ | $v_{d7} = 60.67$ |
| $r_{14} =$ | 47.732 | | $d_{14} =$ (Variable) | | | |
| $r_{15} =$ | ∞ | | $d_{15} = 2.88$ | | $n_{d8} = 1.51633$ | $v_{d8} = 64.14$ |
| $r_{16} =$ | ∞ | | | | | |

Zooming Spaces

| | | | |
|---|---|---|---|
| f | 5.010 | 10.01 | 15.000 |
| $d_3$ | 0.610 | 7.580 | 10.811 |
| $d_7$ | 11.061 | 3.944 | 0.800 |

-continued

| | | | |
|---|---|---|---|
| $d_8$ | 4.658 | 2.480 | 0.800 |
| $d_{12}$ | 1.076 | 2.361 | 3.319 |
| $d_{14}$ | 3.73 | 4.72 | 5.45 |

Aspherical Coefficients

1st surface $K = -1.00$
$A_4 = 6.4757 \times 10^{-8}$
$A_6 = -6.9089 \times 10^{-10}$
$A_8 = -9.8890 \times 10^{-12}$
$A_{10} = -1.5273 \times 10^{-13}$ 2nd surface $K = -1.00$
$A_4 = 6.0032 \times 10^{-8}$
$A_6 = -6.4740 \times 10^{-10}$
$A_8 = -1.0896 \times 10^{-11}$
$A_{10} = -1.4525 \times 10^{-13}$ 7th surface $K = 0.00$
$A_4 = -3.7387 \times 10^{-4}$
$A_6 = -6.4515 \times 10^{-6}$
$A_8 = -3.1567 \times 10^{-7}$
$A_{10} = -1.0844 \times 10^{-8}$ 9th surface $K = 0.00$
$A_4 = -7.2871 \times 10^{-4}$
$A_6 = -1.8543 \times 10^{-5}$
$A_8 = -3.4509 \times 10^{-7}$
$A_{10} = -8.6695 \times 10^{-9}$ 13th surface $K = 0.00$
$A_4 = -2.5262 \times 10^{-4}$
$A_6 = -1.2152 \times 10^{-5}$
$A_8 = 2.0869 \times 10^{-6}$
$A_{10} = -8.9308 \times 10^{-8}$
$f_{DOE} = 2185.7761$
$N_{DOE} \sin\theta = -0.10 \sim 0.30$
$R_{DOE}/f_s = 2.39$
$f_s/f_2 = -0.8727$
$Z = 2.99$ Example 11

$f = 5.000 \sim 17.296 \sim 59.979$
$F_{NO} = 2.8 \sim 3.1 \sim 3.0$
$2\omega = 62.9° \sim 20.1° \sim 5.8°$

| | | | | | | |
|---|---|---|---|---|---|---|
| $r_1 =$ | 96.077 | | $d_1 = 1.40$ | | $n_{d1} = 1.84666$ | $\nu_{d1} = -23.78$ |
| $r_2 =$ | 36.605 | | $d_2 = 1.00$ | | | |
| $r_3 =$ | 38.307540 | (Dif. surf.) | $d_3 = 0.00$ | | $n_{d2} = 1001.00$ | $\nu_{d2} = -3.45$ |
| $r_4 =$ | 38.308100 | | $d_4 = 6.00$ | | $n_{d3} = 1.73400$ | $\nu_{d3} = 51.47$ |
| $r_5 =$ | -216.687 | | $d_5 = 0.15$ | | | |
| $r_6 =$ | 28.197 | | $d_6 = 3.60$ | | $n_{d4} = 1.71300$ | $\theta_{d4} = 53.87$ |
| $r_7 =$ | 81.311 | | $d_7 =$ (Variable) | | | |
| $r_8 =$ | 53.167 | | $d_8 = 0.90$ | | $n_{d5} = 1.83481$ | $\nu_{d5} = 42.72$ |
| $r_9 =$ | 8.600 | | $d_9 = 3.60$ | | | |
| $r_{10} =$ | -17.348 | | $d_{10} = 0.90$ | | $n_{d6} = 1.62041$ | $\nu_{d6} = 60.29$ |
| $r_{11} =$ | 8.571 | | $d_{11} = 0.50$ | | | |
| $r_{12} =$ | 9.760 | | $d_{12} = 2.50$ | | $n_{d7} = 1.84666$ | $\nu_{d7} = 23.78$ |
| $r_{13} =$ | 45.930 | | $d_{13} =$ (Variable) | | | |
| $r_{14} =$ | ∞ | (Stop) | $d_{14} =$ (Variable) | | | |
| $r_{15} =$ | 13.005 | (Aspheric) | $d_{15} = 2.50$ | | $n_{d8} = 1.48749$ | $\nu_{d8} = 70.23$ |
| $r_{16} =$ | 184.810 | | $d_{16} =$ (Variable) | | | |
| $r_{17} =$ | 13.292 | | $d_{17} = 0.90$ | | $n_{d9} = 1.84666$ | $\nu_{d9} = 23.78$ |
| $r_{18} =$ | 6.970 | | $d_{18} = 7.00$ | | $n_{d10} = 1.69680$ | $\nu_{d10} = 55.53$ |
| $r_{19} =$ | -51.913 | (Aspheric) | $d_{19} =$ (Variable) | | | |
| $r_{20} =$ | ∞ | | $d_{20} = 2.00$ | | $n_{d11} = 1.54771$ | $\nu_{d11} = 62.84$ |

-continued

| | | | | |
|---|---|---|---|---|
| $r_{21} =$ | ∞ | $d_{21} = 1.00$ | | |
| $r_{22} =$ | ∞ | $d_{22} = 1.00$ | $n_{d12} = 1.51633$ | $\nu_{d12} = 64.14$ |
| $r_{23} =$ | ∞ | | | |

Zooming Spaces

| | | | |
|---|---|---|---|
| f | 5.000 | 17.296 | 59.979 |
| $d_7$ | 1.000 | 14.897 | 24.175 |
| $d_{13}$ | 24.174 | 10.277 | 1.000 |
| $d_{14}$ | 3.000 | 1.000 | 1.00 |
| $d_{16}$ | 8.661 | 7.340 | 11.549 |
| $d_{19}$ | 6.22 | 9.54 | 5.31 |

Aspherical Coefficients

3rd surface $K = 0.00$
$A_4 = -1.1076 \times 10^{-10}$
$A_6 = -1.7841 \times 10^{-13}$
$A_8 = 2.7891 \times 10^{-16}$
$A_{10} = 0$ 15th surface $K = 0.00$
$A_4 = -1.0703 \times 10^{-4}$
$A_6 = -1.0366 \times 10^{-5}$
$A_8 = -1.0489 \times 10^{-6}$
$A_{10} = 3.7413 \times 10^{-8}$ 19th surface $K = 0.00$
$A_4 = 1.0789 \times 10^{-4}$
$A_6 = 2.0683 \times 10^{-6}$
$A_8 = -1.9709 \times 10^{-7}$
$A_{10} = 5.2019 \times 10^{-9}$
$f_{DOE} = 2620.5162$
$N_{DOE} \sin\theta = -0.38 \sim 0.06$
$R_{DOE}/f_s = 2.21$
$f_s/f_2 = -2.2027$
$Z = 12$ Set out below are the values of conditions (1), (2), (5), (7) and (8) in Examples 1 to 11.

| Condition | | Ex. 1 | Ex. 2 | Ex. 3 | Ex. 4 |
|---|---|---|---|---|---|
| (1) | | 0.0139 | 0.0157 | 0.0085 | 0.0052 |
| (2) | Longitudinal | | | | |
| | Wide-angle | | | | |
| | C | 0.8 | 0.3 | 0.8 | 1.0 |
| | g | -0.3 | -1.7 | -0.4 | -0.4 |
| | Telephoto | | | | |
| | C | -0.1 | -1.7 | 1.5 | 1.3 |
| | g | -1.2 | -2.6 | -2.1 | -2.7 |
| | Magnification | | | | |
| | Wide-angle | | | | |
| | C | 1.4 | 1.4 | 1.1 | 1.0 |
| | g | -0.3 | 0.2 | 0.5 | 0.7 |
| | Telephoto | | | | |
| | C | 1.3 | 2.3 | 0.6 | 0.3 |
| | g | 2.3 | 2.9 | -0.4 | -0.8 |
| (5) | | 0.386 | 0.305 | 0.446 | 0.367 |
| (7) | | 0.0023 | 0.0016 | 0.0009 | 0.0005 |
| (8) | | 0.064 | 0.030 | 0.045 | 0.037 |

| Condition | | Ex. 5 | Ex. 6 | Ex. 7 | Ex. 8 |
|---|---|---|---|---|---|
| (1) | | 0.0050 | 0.0071 | 0.0063 | none |
| (2) | Longitudinal | | | | |
| | Wide-angle | | | | |
| | C | 0.9 | 0.8 | 0.2 | 0.7 |
| | g | -0.3 | -0.4 | -0.1 | -0.8 |
| | Telephoto | | | | |
| | C | 1.4 | 2.2 | 1.5 | 1.0 |
| | g | -1.1 | -3.7 | -1.2 | 1.7 |
| | Magnification | | | | |
| | Wide-angle | | | | |
| | C | 1.1 | 1.1 | 1.1 | 1.0 |
| | g | 0.3 | 0.8 | 0.6 | -2 |
| | Telephoto | | | | |
| | C | 0.3 | 0.7 | 0.8 | -0.3 |
| | g | -0.3 | -0.7 | -1.2 | 1.9 |
| (5) | | 0.388 | 0.455 | 0.396 | 0.265 |
| (7) | | 0.0008 | 0.0006 | 0.0006 | none |
| (8) | | 0.065 | 0.038 | 0.400 | 0.092 |

| Condition | | Ex. 9 | Ex. 10 | Ex. 11 |
|---|---|---|---|---|
| (1) | | 0.0106 | 0.0040 | 0.0066 |
| (2) | Longitudinal | | | |
| | Wide-angle | | | |
| | C | | | |
| | g | | | |
| | Telephoto | | | |

-continued

| | | | |
|---|---|---|---|
| C g Magnification Wide-angle | | | |
| C g Telephoto | | | |
| (5) (7) (8) | C g | 0.31 | 0.26 | 0.45 |

As can be understood from the foregoing explanation, the present invention provides a high image quality zoom lens system suitable for use with an image sensor.

The present invention also provides a high-performance zoom lens system which is well corrected for chromatic aberrations by use of a DOE in the first lens group while a lowering of diffraction efficiency is reduced by reducing the angle of incidence of a light beam on a diffractive surface as much as possible, and is comprised of a reduced number of lenses, and an imaging device using the same as well.

Figure 17:
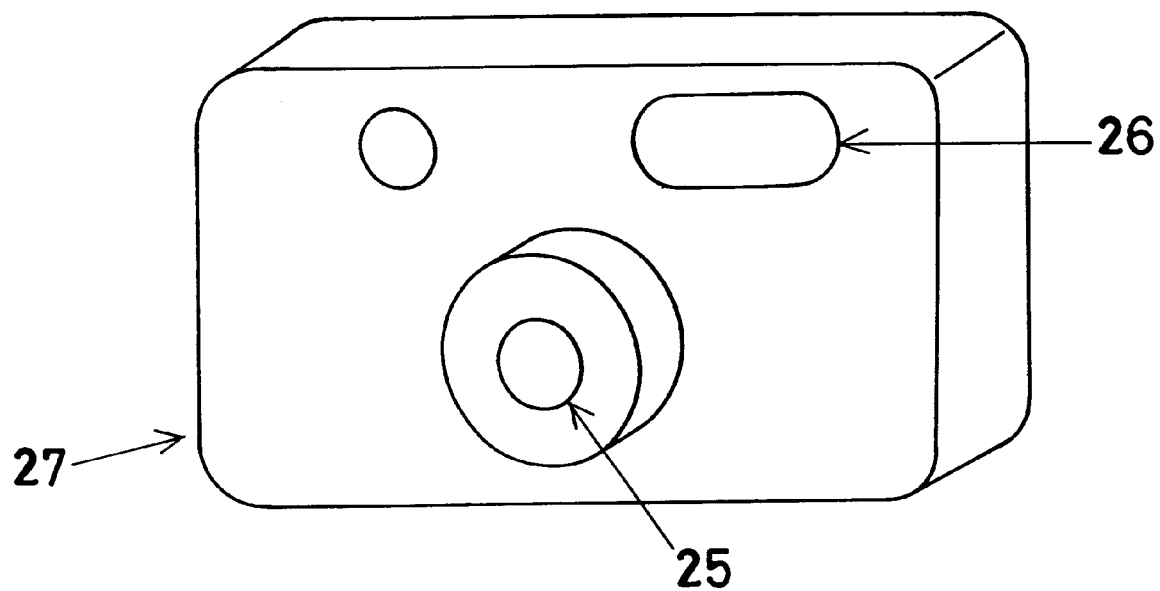
FIG. 17 is a perspective view of a general structure of a camera on which the inventive zoom lens system is mounted.

One typical example of the imaging device using the zoom lens system of the invention is shown in FIG. 17. As disclosed, a phototaking zoom lens 25 may be used with a digital still camera 27 comprising a zooming finder 26 and an image pickup element such as a CCD (not shown). The zoom lens 25 may also be used as an objective for the zooming finder 26.

What is claimed is:

1. A zoom lens system comprising;
   a first lens group having positive power:
   a second lens group having negative power; and
   an aperture stop on an image side of the second lens group,
   wherein said first lens group comprises at least one diffractive surface, and satisfies the following conditions:

$$0.001 < f_S/f_{DOE} < 0.025 \quad (1)$$

$$0.1 < f_S/f_1 < 0.6 \quad (5)$$

where $f_1$ is a focal length of said first lens group, $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface.

2. A zoom lens system comprising:
   a first lens group having positive power;
   a second lens group having negative power; and
   an aperture stop on an image side of the second lens group,
   wherein said first lens group comprises at least one diffractive surface, and satisfies the following conditions:

$$0.001 < f_S/f_{DOE} < 0.025 \quad (1)$$

$$0.1 < f_S/f_1 < 0.5 \quad (6)$$

where $f_1$ is a focal length of said first lens group, $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface.

3. A zoom lens system comprising:
   a first lens group having positive power;
   a second lens group having negative power; and
   an aperture stop on an image side of the second lens group,
   wherein said first lens group comprises at least one diffractive surface, and satisfies the following conditions:

$$0.001 < f_S/f_{DOE} < 0.25 \quad (1)$$

$$0.0001 < f_S/(Z \times f_{DOE}) < 0.005 \quad (7)$$

where $Z = f_T/f_W$, $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface.

4. A zoom lens system comprising:
   a first lens group having positive power;
   a second lens group having negative power; and
   an aperture stop on an image side of the second lens group,
   wherein said first lens group comprises at least one diffractive surface, and satisfies the following conditions:

$$0.01 < f_S/f_{DOE} < 0.025 \quad (1)$$

$$0.01 < f_S/(Z \times f_1) < 0.1 \quad (8)$$

where $f_1$ is a focal length of said first lens group, $Z = f_T/f_W$, $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface.

5. A zoom lens system comprising:
   a first lens group having positive power;
   a second lens group having negative power;
   an aperture stop on an image side of the second lens group,
   a third lens group having positive power; and
   a fourth lens group having positive power between said aperture stop and an image side of said zoom lens system,
   wherein said first lens group comprises at least one diffractive surface, and satisfies the following condition:

$$0.001 < f_S/f_{DOE} < 0.025 \quad (1)$$

where $f_1$ is a focal length of said first lens group, $Z = f_T/f_W$, $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface.

6. A zoom lens system comprising:
   a first lens group having positive power;

a second lens group having negative power;

an aperture stop on an image side of the second lens group;

a third lens group located on the image side of the second lens group; and a fourth lens group located on the image side of the third lens group, wherein said first lens group comprises at least one diffractive surface, and satisfies the following conditions:

$$0.001 < f_S/f_{DOE} < 0.025 \quad (1)$$

where $f_S = \sqrt{(f_W \times f_T)}$, $f_W$ and $f_T$ are focal lengths of said zoom lens system at a wide-angle end thereof and a telephoto end thereof, respectively, and $f_{DOE}$ is a focal length of said diffractive surface wherein during zooming said first lens group is fixed with respect to an image plane while said second lens group, said third lens group, and said fourth lens group are moved.

7. A zoom lens system comprising:

a first lens group having positive power;

a second lens group having negative power; and an aperture stop on an image side of the second lens group, wherein said first lens group comprises at least one diffractive surface, and satisfies the following condition:

$$0.001 < f_S/f_{DOE} < 0.025 \quad (1)$$

where $f_S = \sqrt{(f_W \times f_T)}$ wherein $f_W$ and $f_T$ are focal lengths of said zoom lens system at a wide-angle end thereof and a telephoto end thereof, respectively, and $f_{DOE}$ if length of said diffractive surface, and wherein said first lens group comprises a single lens.

8. A zoom lens system comprising:

a first lens group having positive power;

a second lens group having negative power; and an aperture stop on an image side of the second lens group, wherein said first lens group comprises at least one diffractive surface, and satisfies the following condition:

$$0.001 < f_S/f_{DOE} < 0.025 \quad (1)$$

where $f_S = \sqrt{(f_W \times f_T)}$ wherein $f_W$ and $f_T$ are focal lengths of said zoom lens system at a wide-angle end thereof and a telephoto end thereof, respectively, and $f_{DOE}$ is a focal length of said diffractive surface, and wherein said first lens group comprises at least one positive lens and at least one negative lens.

9. A zoom lens system comprising:

a first lens group having positive power;

a second lens group having negative power; and an aperture stop on an image side of the second lens group, wherein said first lens group comprises at least one diffractive surface, and satisfies the following condition:

$$0.001 < f_S/f_{DOE} < 0.025 \quad (1)$$

where $f_S = \sqrt{(f_W \times f_T)}$ wherein $f_W$ and $f_T$ are focal lengths of said zoom lens system at a wide-angle end thereof and a telephoto end thereof, respectively, and $f_{DOE}$ is a focal length of said diffractive surface, and wherein said diffractive surface is located on a side of a lens located on said object side of said zoom lens system.

10. A zoom lens system comprising a first lens group having positive power;

a second lens group having negative power; and an aperture stop on an image side of the second lens group with a space between said first lens group and said second lens group being variable for zooming, wherein said first lens group comprises a diffractive surface, and an angle of incidence of all chief rays with respect to said diffractive surface during zooming satisfies the following condition:

$$-0.60 < N_{DOE} \sin \theta < 0.70 \quad (9)$$

where $N_{DOE}$ is a refractive index of a medium on a side of said diffractive surface located on said object side with respect to an optimum design wavelength for a diffractive optical element, and $\theta$ is an angle of incidence of chief rays with respect to said diffractive surface, said angle of incidence being defined by a normal direction of a substrate material forming said diffractive surface and chief ray at an infinite object point distance.

11. A zoom lens comprising a first lens group having positive power;

a second lens group having negative power; and an aperture stop on an image side of the second lens group with a space between said first lens group and said second lens group being variable for zooming, wherein said first lens group comprises a diffractive surface, and the following condition is satisfied:

$$0.2 < R_{DOE}/f_S < 15.0 \quad (10)$$

where $R_{DOE}$ is a paraxial radius of curvature of a substrate material of which a diffractive optical element having a diffractive surface is formed, and $f_S = \sqrt{(f_W \times f_T)}$ wherein $f_W$ and $f_T$ are overall focal lengths of said zoom lens system at a wide-angle end thereof and a telephoto end thereof, respectively.

12. The zoom lens system according to claim 10 or 11, which satisfies the following conditions:

$$0.1 < f_S/f_1 < 0.5 \quad (11)$$

$$-2.5 < f_S/f_2 < -0.1 \quad (12)$$

where $f_S = \sqrt{(f_W \times f_T)}$ wherein $f_W$ and $f_T$ are overall focal lengths of said zoom lens system at a wide-angle end thereof and a telephoto end thereof, respectively, and $f_1$ and $f_2$ are focal lengths of said first lens group and said second lens group, respectively.

13. An imaging device using the zoom lens system according to claim 10 or 11.

14. A zoom lens system according to claim 1, 2, 3, 4, 5, 6, 7, 8, 9, 10 or 11, which satisfies the following condition (2):

$$|\Delta p/t|<4, |\Delta s/t|<4 \qquad (2)$$

wherein $\Delta p$ is the change in an amount of transverse aberration of spherical aberrations at an axial maximum ray height with respect to C-line and g-line from a wide-angle end of the zoom lens system to a telephoto end of the zoom lens system, $\Delta s$ is the change in an amount of chromatic aberration of magnification at an image height that is 0.7 times a maximum image height with respect to C-line and g-line from a wide-angle end of the zoom lens system to a telephoto end of the zoom lens system and t is a pitch of one pixel in an image sensor used with the zoom lens system.

* * * * *